United States Patent
Hashimoto

(10) Patent No.: US 9,341,823 B2
(45) Date of Patent: May 17, 2016

(54) IMAGING LENS

(71) Applicant: KANTATSU CO., LTD., Yaita-shi, Tochigi (JP)

(72) Inventor: Masaya Hashimoto, Sukagawa (JP)

(73) Assignee: KANTATSU CO., LTD., Tochigi (JP)

( * ) Notice: Subject to any disclaimer, the term of this patent is extended or adjusted under 35 U.S.C. 154(b) by 0 days.

(21) Appl. No.: 14/573,052

(22) Filed: Dec. 17, 2014

(65) Prior Publication Data
US 2016/0004043 A1   Jan. 7, 2016

(30) Foreign Application Priority Data
Jul. 4, 2014   (JP) .................. 2014-138746

(51) Int. Cl.
G02B 13/04   (2006.01)
G02B 9/60    (2006.01)
G02B 13/00   (2006.01)

(52) U.S. Cl.
CPC .............. G02B 13/0045 (2013.01); G02B 9/60 (2013.01)

(58) Field of Classification Search
CPC ............................. G02B 13/0045; G02B 9/60
USPC .................. 359/713, 714, 749–753, 763, 770
See application file for complete search history.

(56) References Cited

U.S. PATENT DOCUMENTS

| 2014/0198396 A1* | 7/2014 | Hsu | G02B 13/0045 359/714 |
| 2015/0077864 A1* | 3/2015 | Noda | G02B 13/18 359/714 |
| 2015/0370047 A1* | 12/2015 | Kubota | G02B 9/60 359/714 |

FOREIGN PATENT DOCUMENTS

JP   2011-85733 A   4/2011

* cited by examiner

*Primary Examiner* — Scott J Sugarman
(74) *Attorney, Agent, or Firm* — Westerman, Hattori, Daniels & Adrian, LLP

(57) ABSTRACT

A compact low-cost imaging lens which meets the demand for low-profileness, offers high brightness with an F-value of 2.5 or less and a wide field of view, and corrects aberrations properly. Its elements are arranged in order from an object side to an image side: a positive first lens having a convex object-side surface; a negative second lens having a concave image-side surface; a negative third lens; a negative fourth lens as a meniscus double-sided aspheric lens having a convex image-side surface; and a double-sided aspheric fifth lens having a concave image-side surface. The aspheric image-side surface of the fifth lens has a pole-change point off an optical axis, and the imaging lens satisfies conditional expressions (1) and (2):

$$TTL/2ih \leq 0.8 \quad (1)$$

$$20 < vd1 - vd2 < 50 \quad (2)$$

where
vd1: Abbe number of the first lens at d-ray
vd2: Abbe number of the second lens at d-ray
ih: maximum image height
TTL: total track length.

6 Claims, 20 Drawing Sheets

IMAGING LENS

The present application is based on and claims priority of Japanese patent application No. 2014-138746 filed on Jul. 4, 2014, the entire contents of which are hereby incorporated by reference.

BACKGROUND OF THE INVENTION

1. Field of the Invention

The present invention relates to imaging lenses which form an image of an object on a solid-state image sensor such as a CCD sensor or a C-MOS sensor used in a compact image pickup device, and more particularly to imaging lenses which are built in image pickup devices mounted in increasingly compact and low-profile smart phones and mobile phones, PDAs (Personal Digital Assistants), game consoles, information terminals such as PCs, and home appliances with a camera function.

2. Description of the Related Art

In recent years, there has been a general tendency that many information terminals have a camera function. Also, home appliances with a camera function have been introduced into the market. For example, a user who is away from home can see in real time what is going on at home, through the camera mounted in a home appliance by telecommunication between the home appliance and his/her smart phone. It is thought that products which enhance consumer convenience by adding a camera function to an information terminal or home appliance will be increasingly developed in the future. The camera mounted in such a product is expected not only to provide high resolution to cope with an increase in the number of pixels but also to be compact and low-profile and offer high brightness and a wide field of view. Particularly, the imaging lens to be built in a mobile terminal is strongly expected not only to be low-profile enough to be applicable to a low-profile product but also to deliver high imaging performance.

However, in order to provide a low-profile imaging lens with a wide field of view and high brightness as described above, the following problem has to be addressed: it is difficult to correct aberrations in the peripheral area of the image and ensure high imaging performance throughout the image.

In the related art, for example, the imaging lens described in JP-A-2011-085733 (Patent Document 1) is known as a compact high-resolution imaging lens.

Patent Document 1 discloses an imaging lens which includes, in order from an object side, a first lens group including a first lens having a convex surface on the object side, a second lens group including a second lens having a concave surface on an image side, a third lens group including a meniscus third lens having a concave surface on the object side, a fourth lens group including a meniscus fourth lens having a concave surface on the object side, and a fifth lens group including a meniscus fifth lens having an aspheric surface with an inflection point on the object side. This configuration is intended to provide a compact imaging lens system which offers high resolution.

The imaging lens described in Patent Document 1 has a total track length of about 6.0 mm and the ratio of total track length to the diagonal length of the effective imaging plane of the image sensor (hereinafter referred to as the "total length to diagonal ratio") is about 0.9, offering a lens system which is relatively low-profile and corrects aberrations properly. However, its F-value is about 2.8, so its brightness is not sufficient. Furthermore, its field of view is about 65 degrees, which is insufficient to meet the demand for a wide field of view. Furthermore, in order for this configuration to offer an F-value of 2.5 or less and a field of view of 70 degrees or more, the problem with difficulty in correction of aberrations in the peripheral area of the image must be addressed.

SUMMARY OF THE INVENTION

The present invention has been made in view of the above problem, and an object thereof is to provide a compact high-resolution imaging lens which meets the demand for low-profileness and offers high brightness with an F-value of 2.5 or less and a wide field of view and corrects various aberrations properly.

Here, "low-profile" implies that the total length to diagonal ratio is much smaller than 1.0 and "wide field of view" implies that the imaging field of view is 70 degrees or more. In determination of the total length to diagonal ratio, the diagonal length of the effective imaging plane of the image sensor is taken as equal to the diameter of an effective imaging circle whose radius is the vertical height from an optical axis to the point where a light ray incident on the imaging lens at a maximum field of view enters the image plane, namely the maximum image height.

In the present invention, in terms of lens surface shape, a convex surface or a concave surface means that the paraxial portion of the surface (portion near the optical axis) is convex or concave. A "pole-change point" on an aspheric surface means a point on an aspheric surface at which a tangential plane intersects the optical axis perpendicularly. The values of total track length and back focus are defined as distances on the optical axis as calculated with an optical element such as an IR cut filter or a cover glass removed.

According to one aspect of the present invention, there is provided an imaging lens which forms an image of an object on a solid-state image sensor, in which elements are arranged in the following order from an object side to an image side: a first lens with positive refractive power having a convex surface on the object side; a second lens with negative refractive power having a concave surface on the image side; a third lens with negative refractive power; a fourth lens with negative refractive power as a meniscus double-sided aspheric lens having a convex surface on the image side; and a fifth lens as a double-sided aspheric lens having a concave surface on the image side. The aspheric image-side surface of the fifth lens has a pole-change point off an optical axis and the imaging lens satisfies conditional expressions (1) and (2) below:

$$TTL/2ih \leq 0.8 \tag{1}$$

$$20 < vd1 - vd2 < 50 \tag{2}$$

where
vd1: Abbe number of the first lens at d-ray
vd2: Abbe number of the second lens at d-ray
ih: maximum image height
TTL: total track length.

The imaging lens with the above configuration is composed of five constituent lenses in which positive, negative, negative, negative, and positive or negative refractive power constituent lenses are arranged in order from the object side. The composite focal length of the second, third, fourth, and fifth lenses is negative refractive power, thereby enhancing the telephoto capability, and refractive power is appropriately distributed to the constituent lenses to make the imaging lens low-profile.

The first lens is a lens with positive refractive power having a convex surface on the object side and its refractive power is strong enough to ensure that the imaging lens is low-profile and offers a wide field of view. The second lens is a lens with negative refractive power having a concave surface on the image side and properly corrects spherical aberrations and chromatic aberrations which occur on the first lens. The third lens has relatively weak negative refractive power among the constituent lenses of the imaging lens and suppresses spherical aberrations which occur on the first lens and the second lens. It is desirable for the third lens to have an appropriate aspheric surface on each side and if it has appropriate aspheric surfaces, high-order spherical aberrations and coma aberrations can be made small. The fourth lens is a meniscus double-sided aspheric lens with negative refractive power having a convex surface on the image side so that it not only controls the angles of incident rays and corrects astigmatism but also controls the angle of a chief ray incident on the image sensor and corrects field curvature and distortion. The fifth lens is a double-sided aspheric lens having a concave surface on the image side and its aspheric image-side surface has a pole-change point to correct field curvature and distortion and control the angle of a chief ray incident on the image sensor.

The conditional expression (1) defines an appropriate range for the total length to diagonal ratio. When the value is below the upper limit of the conditional expression (1), the imaging lens can meet the recent demand for low-profileness.

The conditional expression (2) defines an appropriate range for the difference between the Abbe numbers of the first lens and the second lens at d-ray, and indicates a condition to properly correct chromatic aberrations which occur on the first lens. When materials which satisfy the conditional expression (2) are combined, chromatic aberrations can be corrected properly.

Preferably, the imaging lens according to the present invention satisfies a conditional expression (3) below:

$$0 < vd3 - vd4 < 40 \quad (3)$$

where
vd3: Abbe number of the third lens at d-ray
vd4: Abbe number of the fourth lens at d-ray.

The conditional expression (3) defines an appropriate range for the difference between the Abbe numbers of the third lens and fourth lens at d-ray. When material which satisfies the conditional expression (3) is used for the third and the fourth lenses, chromatic aberrations can be corrected properly even with a small F-value.

Preferably, the imaging lens according to the present invention satisfies conditional expressions (4) and (5):

$$0.4 < f1/f < 1.0 \quad (4)$$

$$-1.5 < f2345/f < -0.6 \quad (5)$$

where
f: focal length of the overall optical system of the imaging lens
f1: focal length of the first lens
f2345: composite focal length of the second, third, fourth and fifth lenses.

The conditional expression (4) defines an appropriate range for the ratio of the focal length of the first lens to the focal length of the overall optical system, and indicates a condition to suppress spherical aberrations, ensure low-profileness and offer a wide field of view. If the value is above the upper limit of the conditional expression (4), the positive refractive power of the first lens would be too weak to ensure that the imaging lens is low-profile and offers a wide field of view, though it would be advantageous in suppressing spherical aberrations. On the other hand, if the value is below the lower limit of the conditional expression (4), the positive refractive power of the first lens would be too strong and spherical aberrations would increase, though it would be advantageous in ensuring that the imaging lens is low-profile and offers a wide field of view.

The conditional expression (5) defines an appropriate range for the ratio of the composite focal length of the second, third, fourth, and fifth lenses to the focal length of the overall optical system, and indicates a condition to correct chromatic aberrations properly. If the value is above the upper limit of the conditional expression (5), the negative composite refractive power of the second, third, fourth, and fifth lenses would be too strong to shorten the total track length of the optical system. On the other hand, if the value is below the lower limit of the conditional expression (5), the negative composite refractive power of the second, third, fourth, and fifth lenses would be too weak to correct chromatic aberrations. When the conditional expression (5) is satisfied, aberrations can be corrected and the total track length can be short.

Preferably, the imaging lens according to the present invention satisfies a conditional expression (6) below:

$$1.5 < r4/f < 2.3 \quad (6)$$

where
f: focal length of the overall optical system of the imaging lens
r4: curvature radius of the image-side surface of the second lens.

The conditional expression (6) defines an appropriate range for the ratio of the curvature radius of the image-side surface of the second lens to the focal length of the overall optical system of the imaging lens. If the value is above the upper limit of the conditional expression (6), the negative refractive power of the second lens would be too weak to correct axial chromatic aberrations which occur on the first lens. On the other hand, if the value is below the lower limit of the conditional expression (6), the incidence angles of peripheral rays on the image-side surface of the second lens would be too large to suppress coma aberrations. If the incidence angles of rays are too large, manufacturing error sensitivity would increase, making stable mass production difficult.

Preferably, the imaging lens according to the present invention satisfies a conditional expression (7) below:

$$-1.9 < (r1+r2)/(r1-r2) < -0.7 \quad (7)$$

where
r1: curvature radius of the object-side surface of the first lens
r2: curvature radius of the image-side surface of the first lens.

The conditional expression (7) defines an appropriate range for the ratio of the sum of the curvature radii of the object-side and image-side surfaces of the first lens to the difference between them, namely the relation in curvature radius between the object-side and image-side surfaces of the first lens, and indicates a condition to keep distortion, astigmatism, and spherical aberrations within appropriate ranges. If the value is above the upper limit of the conditional expression (7), the principal point of the first lens would shift toward the image side, making it difficult to keep the total length of the imaging lens short. If the value is below the lower limit of the conditional expression (7), it would be difficult to correct spherical aberrations.

Preferably, the imaging lens according to the present invention satisfies a conditional expression (8):

$$-6.0 < f45/f < -3.0 \quad (8)$$

where f: focal length of the overall optical system of the imaging lens f45: composite focal length of the fourth and fifth lenses.

The conditional expression (8) defines an appropriate range for the ratio of the composite focal length of the fourth and fifth lenses to the focal length of the overall optical system of the imaging lens, and indicates a condition to make the imaging lens low-profile, ensure an appropriate back focus, and correct chromatic aberrations properly. If the value is above the upper limit of the conditional expression (8), the negative composite refractive power of the fourth and fifth lenses would be stronger and undesirably the total track length would be longer, though it would be easy to ensure an appropriate back focus. On the other hand, if the value is below the lower limit of the conditional expression (8), the negative composite refractive power of the fourth and fifth lenses would be too weak to correct chromatic aberrations properly.

DETAILED DESCRIPTION OF THE PREFERRED EMBODIMENTS

Hereinafter, the preferred embodiment of the present invention will be described in detail referring to the accompanying drawings. FIGS. 1, 3, 5, 7, 9, 11, 13, 15, 17, and 19 are schematic views showing the general configurations of the imaging lenses in Examples 1 to 10 according to this embodiment, respectively. Since all these examples have the same basic lens configuration, the general configuration of an imaging lens according to this embodiment is explained below referring to the schematic view of Example 1.

Figure 1:
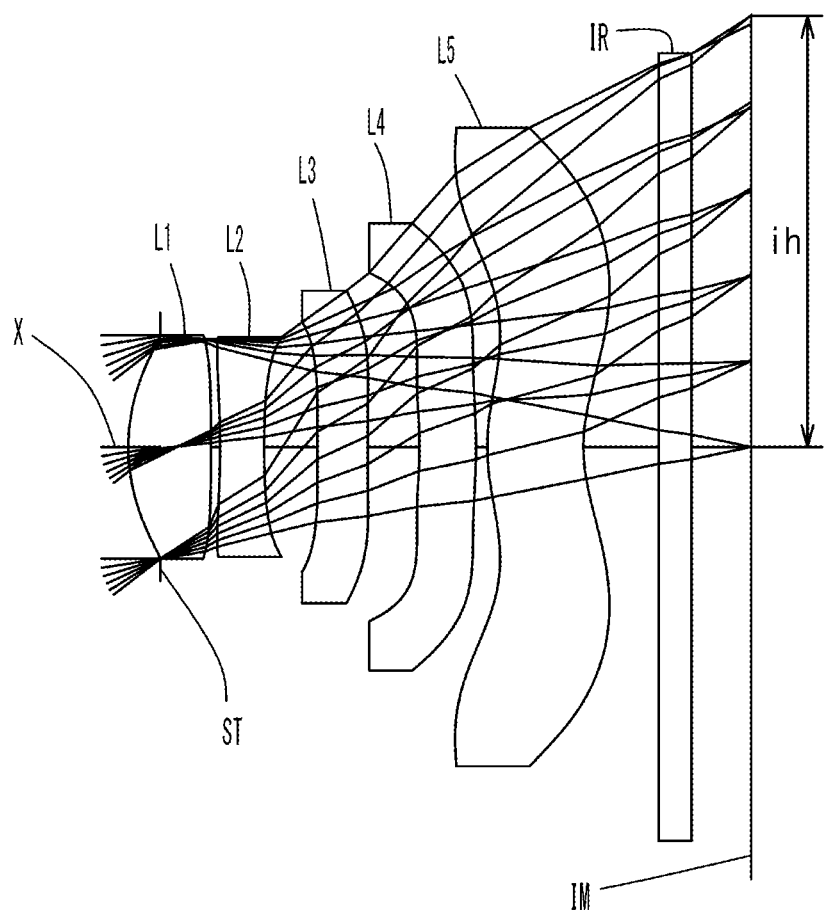
FIG. 1 is a schematic view showing the general configuration of an imaging lens in Example 1.

As shown in FIG. 1, the imaging lens according to this embodiment forms an image of an object on a solid-state image sensor and includes, in order from an object side to an image side, an aperture stop ST, a first lens L1 with positive refractive power having a convex surface on the object side, a second lens L2 with negative refractive power having a concave surface on the image side, a third lens L3 with negative refractive power, a fourth lens L4 with negative refractive power as a meniscus double-sided aspheric lens having a convex surface on the image side, and a fifth lens L5 as a double-sided aspheric lens having a concave surface on the image side. The aspheric image-side surface of the fifth lens L5 has a pole-change point off an optical axis X. A filter IR such as an infrared cut filter is located between the fifth lens L5 and an image plane IM. The filter IR is omissible.

In the imaging lens according to this embodiment, positive, negative, negative, negative, and negative power constituent lenses are arranged in order from the object side. The four lenses other than the first lens L1 have negative refractive power to enhance the telephoto capability, and refractive power is appropriately distributed to the constituent lenses to make the imaging lens low-profile. However, as for the fifth lens L5, it may have weak positive refractive power, provided that the composite refractive power of the four lenses, namely the second lens L2 to fifth lens L5, is negative. In Examples 5 to 10 shown in FIGS. 9 to 20, the fifth lens L5 has positive refractive power.

The first lens L1 has a biconvex shape and suppresses spherical aberrations and gives the required positive refractive power to the overall optical system of the imaging lens. The shape of the first lens L1 is not limited to a biconvex shape. For example, it may be a meniscus lens having a convex surface on the object side as in Examples 2, 4, 6, 7, 8, and 10 shown in FIGS. 3, 7, 11, 13, 15, and 19, respectively. The curvature radius of the object-side surface is smaller than the curvature radius of the image-side surface so that the relation in curvature radius between them is appropriate to suppress spherical aberrations.

The second lens L2 has a biconcave shape and properly corrects spherical aberrations, coma aberrations, and chromatic aberrations which occur on the first lens L1. The shape of the second lens L2 is not limited to a biconcave shape. For example, it may be a meniscus lens having a concave surface on the image side as in Examples 8 and 10 shown in FIGS. 15 and 19, respectively.

The third lens L3 has a meniscus shape with a convex surface on the object side and its negative refractive power is relatively weak among the constituent lenses of the imaging lens. The both surfaces of the third lens L3 are aspheric and used to properly correct spherical aberrations, coma aberrations and field curvature which occur on the first lens L1 and the second lens L2. The third lens L3 should have negative refractive power but it may be a biconcave lens as in Example 4 shown in FIG. 7 or a meniscus lens having the concave surface on the object side as in Examples 2, 3, 6, 8, and 9 shown in FIGS. 3, 5, 11, 15, and 17, respectively.

The fourth lens L4 has a meniscus shape with a convex surface on the image side and the aspheric surfaces on the both sides are used not only to control the angle of rays incident on the fourth lens L4 and correct astigmatism, but also to control the angle of a chief ray incident on the image sensor and correct field curvature and distortion.

The fifth lens L5 has a meniscus shape with a convex surface on the object side, its concave image-side surface ensures an appropriate back focus, and enhances the telephoto capability. The aspheric surfaces on the both sides are used to properly correct spherical aberrations and field curvature which occur on the fourth lens L4. The aspheric image-side surface has a pole-change point off the optical axis X to control the angles of peripheral rays incident on the image plane IM appropriately.

In the imaging lens according to this embodiment, all the constituent lenses are made of plastic material, so the manufacturing process is made easier and the imaging lens can be mass-produced at low cost. All the lens surfaces have appropriate aspheric shapes so that various aberrations can be corrected more properly.

When the imaging lens according to this embodiment satisfies conditional expressions (1) to (8) below, it brings about advantageous effects:

$$TTL/2ih \leq 0.8 \tag{1}$$

$$20 < vd1 - vd2 < 50 \tag{2}$$

$$0 < vd3 - vd4 < 40 \tag{3}$$

$$0.4 < f1/f < 1.0 \tag{4}$$

$$-1.5 < f2345/f < -0.6 \tag{5}$$

$$1.5 < r4/f < 2.3 \tag{6}$$

$$-1.9 < (r1+r2)/(r1-r2) < -0.7 \tag{7}$$

$$-6.0 < f45/f < -3.0 \tag{8}$$

where
f: focal length of the overall optical system of the imaging lens
f1: focal length of the first lens L1
f2345: composite focal length of the second lens L2, the third lens L3, the fourth lens L4 and the fifth lens L5
f45: composite focal length of the fourth lens L4 and the fifth lens L5
r1: curvature radius of the object-side surface of the first lens L1
r2: curvature radius of the image-side surface of the first lens L1
r4: curvature radius of the image-side surface of the second lens L2
vd1: Abbe number of the first lens L1 at d-ray
vd2: Abbe number of the second lens L2 at d-ray
vd3: Abbe number of the third lens L3 at d-ray
vd4: Abbe number of the fourth lens L4 at d-ray
TLA: total track length
ih: maximum image height.

When the imaging lens according to this embodiment satisfies conditional expressions (1a) to (8a) below, it brings about more advantageous effects:

$$0.5 < TTL/2ih < 0.8 \tag{1a}$$

$$25 < vd1 - vd2 < 40 \tag{2a}$$

$$0 < vd3 - vd4 < 38 \tag{3a}$$

$$0.5 < f1/f < 0.9 \tag{4a}$$

$$-1.5 < f2345/f < -0.7 \tag{5a}$$

$$1.5 < r4/f < 2.0 \tag{6a}$$

$$-1.7 < (r1+r2)/(r1-r2) < -0.7 \tag{7a}$$

$$-5.0 < f45/f < -3.0. \tag{8a}$$

In the above conditional expressions, the signs have the same meanings as in the preceding paragraph.

When the imaging lens according to this embodiment satisfies conditional expressions (1b) to (8b) below, it brings about particularly advantageous effects:

$$0.67 \leq TTL/2ih \leq 0.75 \tag{1b}$$

$$28 < vd1 - vd2 < 35 \tag{2b}$$

$$0 < vd3 - vd4 < 35 \tag{3b}$$

$$0.6 \leq f1/f \leq 0.8 \tag{4b}$$

$$-1.42 \leq f2345/f \leq -0.76 \tag{5b}$$

$$1.65 \leq r4/f \leq 1.9 \tag{6b}$$

$$-1.55 \leq (r1+r2)/(r1-r2) \leq -0.86 \tag{7b}$$

$$-4.68 \leq f45/f \leq -3.49. \tag{8b}$$

In the above conditional expressions, the signs have the same meanings as in the paragraph before the preceding paragraph.

In this embodiment, all the lens surfaces are aspheric. The aspheric shapes of these lens surfaces are expressed by Equation 1, where Z denotes an axis in the optical axis direction, H denotes a height perpendicular to the optical axis, k denotes a conic constant, and A4, A6, A8, A10, A12, A14, and A16 denote aspheric surface coefficients.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16} \quad \text{Equation 1}$$

Next, examples of the imaging lens according to this embodiment will be explained. In each example, f denotes the focal length of the overall optical system of the imaging lens, Fno denotes an F-number, ω denotes a half field of view, TTL denotes total track length, ih denotes a maximum image height. i denotes a surface number counted from the object side, r denotes a curvature radius, d denotes the distance on the optical axis between lens surfaces (surface distance), Nd denotes a refractive index at d-ray (reference wavelength), and vd denotes an Abbe number at d-ray. As for aspheric surfaces, an asterisk (*) after surface number i indicates that the surface concerned is an aspheric surface.

Example 1

The basic lens data of Example 1 is shown in Table 1 below.

TABLE 1

| Example 1 in mm |
|---|
| f = 2.917 |
| Fno = 2.45 |
| ω(°) = 37.6 |
| TTL = 3.25 |
| ih = 2.30 |

| Surface Data | | | | |
|---|---|---|---|---|
| Surface No. i | Curvature Radius r | Surface Distance d | Refractive Index Nd | Abbe Number νd |
| (Object Surface) | Infinity | Infinity | | |
| 1 (Stop) | Infinity | −0.170 | | |
| 2* | 1.022 | 0.441 | 1.544 | 55.57 |
| 3* | −13.146 | 0.048 | | |
| 4* | −4.287 | 0.234 | 1.639 | 23.25 |
| 5* | 4.858 | 0.284 | | |
| 6* | 42.666 | 0.267 | 1.535 | 55.66 |
| 7* | 18.737 | 0.276 | | |
| 8* | −2.087 | 0.301 | 1.639 | 23.25 |
| 9* | −2.715 | 0.060 | | |
| 10* | 1.125 | 0.512 | 1.535 | 55.66 |
| 11* | 0.916 | 0.400 | | |
| 12 | Infinity | 0.175 | 1.517 | 64.17 |
| 13 | Infinity | 0.314 | | |
| Image Plane | Infinity | | | |

| Lens | Start Surface | Focal Length |
|---|---|---|
| Constituent Lens Data | | |
| 1 | 2 | 1.762 |
| 2 | 4 | −3.528 |
| 3 | 6 | −62.711 |
| 4 | 8 | −17.384 |
| 5 | 10 | −61.956 |
| Composite Focal Length | | |
| f2345 | | −2.210 |
| f45 | | −11.651 |

| Aspheric Surface Data | | | | | |
|---|---|---|---|---|---|
| | 2nd Surface | 3rd Surface | 4th Surface | 5th Surface | 6th Surface |
| k | −6.114E−02 | −4.101E+01 | −1.300E+02 | 4.489E+01 | −1.315E−01 |
| A4 | −6.219E−02 | −7.195E−04 | 1.036E−01 | 2.320E−01 | −3.038E−01 |
| A6 | 2.299E−01 | −1.983E+00 | −1.063E+00 | 7.439E−01 | 5.806E−02 |
| A8 | −1.989E+00 | 1.225E+01 | 1.113E+01 | −2.971E+00 | −1.054E+01 |
| A10 | 3.816E+00 | −4.177E+01 | −4.128E+01 | 1.313E+01 | 7.809E+01 |
| A12 | −4.291E+00 | 6.014E+01 | 6.352E+01 | −3.130E+01 | −2.544E+02 |
| A14 | −4.029E+00 | −2.701E+01 | −2.433E+01 | 3.607E+01 | 4.009E+02 |
| A16 | 0.000E+00 | 0.000E+00 | 0.000E+00 | 0.000E+00 | −2.542E+02 |
| | 7th Surface | 8th Surface | 9th Surface | 10th Surface | 11th Surface |
| k | −2.006E−01 | −1.973E+01 | 1.298E+00 | −3.587E+00 | −5.022E+00 |
| A4 | 2.222E−01 | 1.420E+00 | 8.958E−01 | −6.795E−01 | −3.469E−01 |
| A6 | −2.504E+00 | −5.214E+00 | −2.087E+00 | 4.538E−01 | 2.757E−01 |
| A8 | 3.378E+00 | 1.055E+01 | 2.367E+00 | −1.844E−01 | −2.000E−01 |
| A10 | 5.730E+00 | −1.626E+01 | −1.743E+00 | 9.445E−02 | 1.111E−01 |
| A12 | −2.508E+01 | 1.668E+01 | 7.859E−01 | −4.499E−02 | −4.075E−02 |
| A14 | 3.159E+01 | −1.016E+01 | −1.805E−01 | 1.159E−02 | 8.258E−03 |
| A16 | −1.403E+01 | 2.658E+00 | 1.389E−02 | −1.158E−03 | −6.788E−04 |

As shown in Table 11, the imaging lens in Example 1 satisfies all the conditional expressions (1) to (8).

Figure 2:
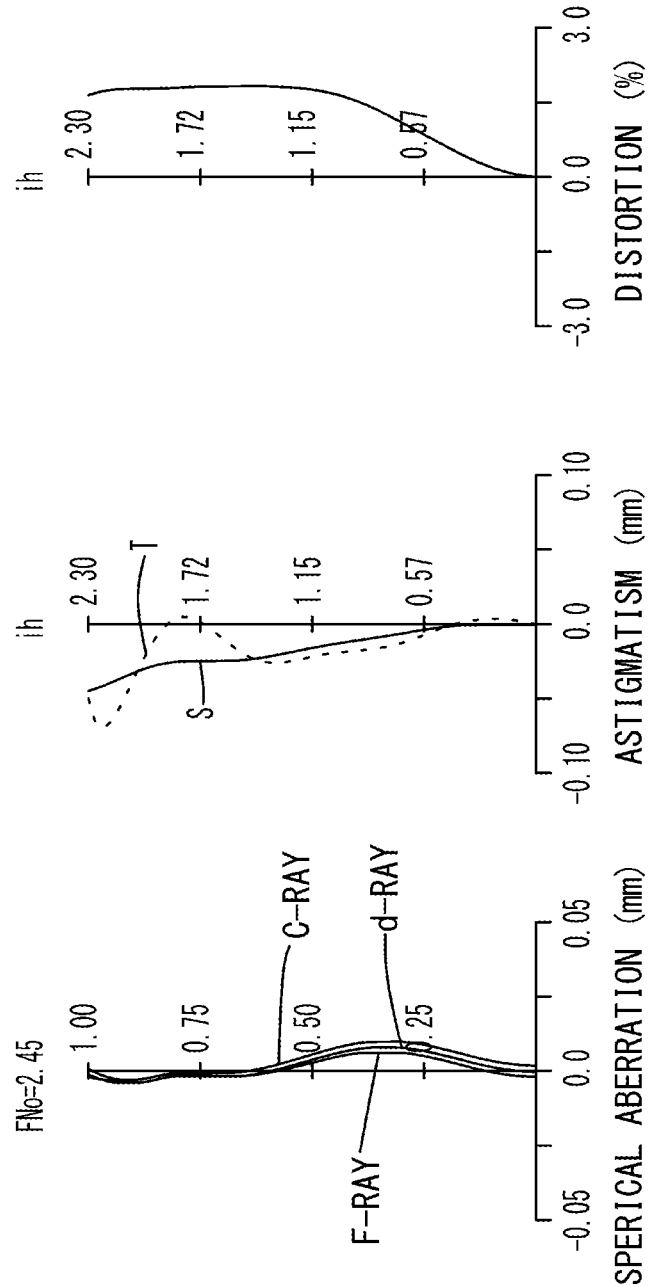
FIG. 2 shows spherical aberration, astigmatism, and distortion of the imaging lens in Example 1.
Figure 3:
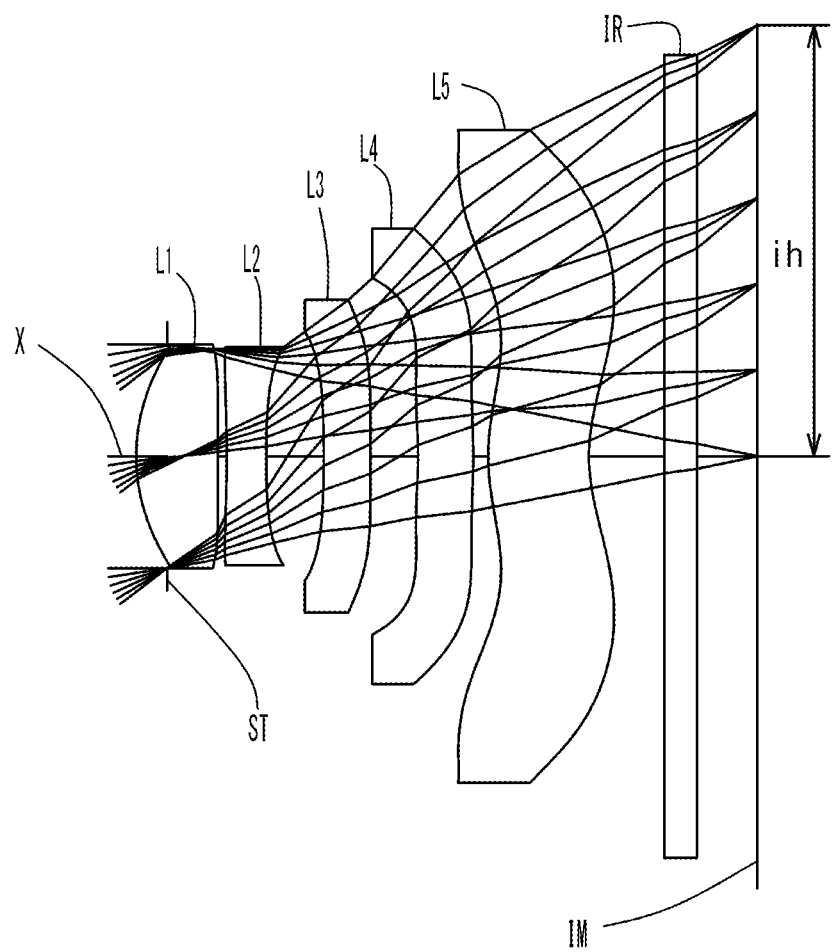
FIG. 3 is a schematic view showing the general configuration of an imaging lens in Example 2.

FIG. 2 shows spherical aberration (mm), astigmatism (mm), and distortion (%) of the imaging lens in Example 1. The spherical aberration diagram shows the amount of aberration at wavelengths of F-ray (486 nm), d-ray (588 nm), and C-ray (656 nm). The astigmatism diagram shows the amount of aberration at d-ray on sagittal image surface S and the amount of aberration at d-ray on tangential image surface T (the same is true for FIGS. 4, 6, 8, 10, 12, 14, 16, 18, and 20).

As shown in FIG. 2, each aberration is corrected properly.

In Example 1, total track length TTL is 3.25 mm, suggesting that the imaging lens is low-profile though it uses five constituent lenses. Also, the imaging lens offers a wide field of view of about 75 degrees and high brightness with an F-value of about 2.45.

Example 2

The basic lens data of Example 2 is shown in Table 2 below.

TABLE 2

| Example 2 in mm |
|---|

$f = 2.922$
$Fno = 2.46$
$\omega(°) = 37.5$
$TTL = 3.24$
$ih = 2.30$

Surface Data

| Surface No. i | Curvature Radius r | Surface Distance d | Refractive Index Nd | Abbe Number νd |
|---|---|---|---|---|
| (Object Surface) | Infinity | Infinity | | |
| 1 (Stop) | Infinity | −0.165 | | |
| 2* | 0.990 | 0.436 | 1.544 | 55.57 |
| 3* | 31.808 | 0.046 | | |
| 4* | −6.408 | 0.210 | 1.639 | 23.25 |
| 5* | 4.855 | 0.306 | | |
| 6* | −9.554 | 0.250 | 1.535 | 55.66 |
| 7* | −16.531 | 0.252 | | |
| 8* | −2.380 | 0.295 | 1.639 | 23.25 |
| 9* | −3.300 | 0.080 | | |
| 10* | 1.170 | 0.536 | 1.535 | 55.66 |
| 11* | 0.962 | 0.400 | | |
| 12 | Infinity | 0.175 | 1.517 | 64.20 |
| 13 | Infinity | 0.316 | | |
| Image Plane | Infinity | | | |

| Lens | Start Surface | Focal Length |
|---|---|---|
| Constituent Lens Data | | |
| 1 | 2 | 1.869 |
| 2 | 4 | −4.291 |
| 3 | 6 | −42.864 |
| 4 | 8 | −15.256 |
| 5 | 10 | −100.492 |
| Composite Focal Length | | |
| f2345 | | −2.480 |
| f45 | | −11.266 |

Aspheric Surface Data

| | 2nd Surface | 3rd Surface | 4th Surface | 5th Surface | 6th Surface |
|---|---|---|---|---|---|
| k | 0.000E+00 | 0.000E+00 | −3.214E+02 | 5.722E+01 | 0.000E+00 |
| A4 | −5.668E−02 | −2.078E−02 | 9.129E−02 | 2.085E−01 | −2.526E−01 |
| A6 | 2.535E−01 | −2.019E+00 | −1.177E+00 | 8.319E−01 | 9.716E−02 |
| A8 | −1.805E+00 | 1.212E+01 | 1.111E+01 | −3.094E+00 | −1.076E+01 |
| A10 | 3.686E+00 | −4.162E+01 | −4.126E+01 | 1.259E+01 | 7.840E+01 |
| A12 | −4.291E+00 | 6.013E+01 | 6.352E+01 | −3.130E+01 | −2.544E+02 |
| A14 | −4.355E+00 | −2.592E+01 | −2.292E+01 | 3.811E+01 | 3.999E+02 |
| A16 | 0.000E+00 | 0.000E+00 | 0.000E+00 | 0.000E+00 | −2.538E+02 |

| | 7th Surface | 8th Surface | 9th Surface | 10th Surface | 11th Surface |
|---|---|---|---|---|---|
| k | 0.000E+00 | −1.387E+01 | 4.805E+00 | −3.196E+00 | −4.785E+00 |
| A4 | 2.616E−01 | 1.440E+00 | 8.554E−01 | −6.706E−01 | −3.564E−01 |
| A6 | −2.462E+00 | −5.210E+00 | −2.044E+00 | 4.490E−01 | 2.815E−01 |
| A8 | 3.400E+00 | 1.058E+01 | 2.379E+00 | −1.855E−01 | −1.992E−01 |
| A10 | 5.652E+00 | −1.624E+01 | −1.758E+00 | 9.505E−02 | 1.107E−01 |
| A12 | −2.508E+01 | 1.681E+01 | 7.895E−01 | −4.493E−02 | −4.082E−02 |

TABLE 2-continued

| | | | | | |
|---|---|---|---|---|---|
| A14 | 3.183E+01 | −1.028E+01 | −1.795E−01 | 1.156E−02 | 8.227E−03 |
| A16 | −1.423E+01 | 2.704E+00 | 1.317E−02 | −1.160E−03 | −6.671E−04 |

As shown in Table 11, the imaging lens in Example 2 satisfies all the conditional expressions (1) to (8).

Figure 4:
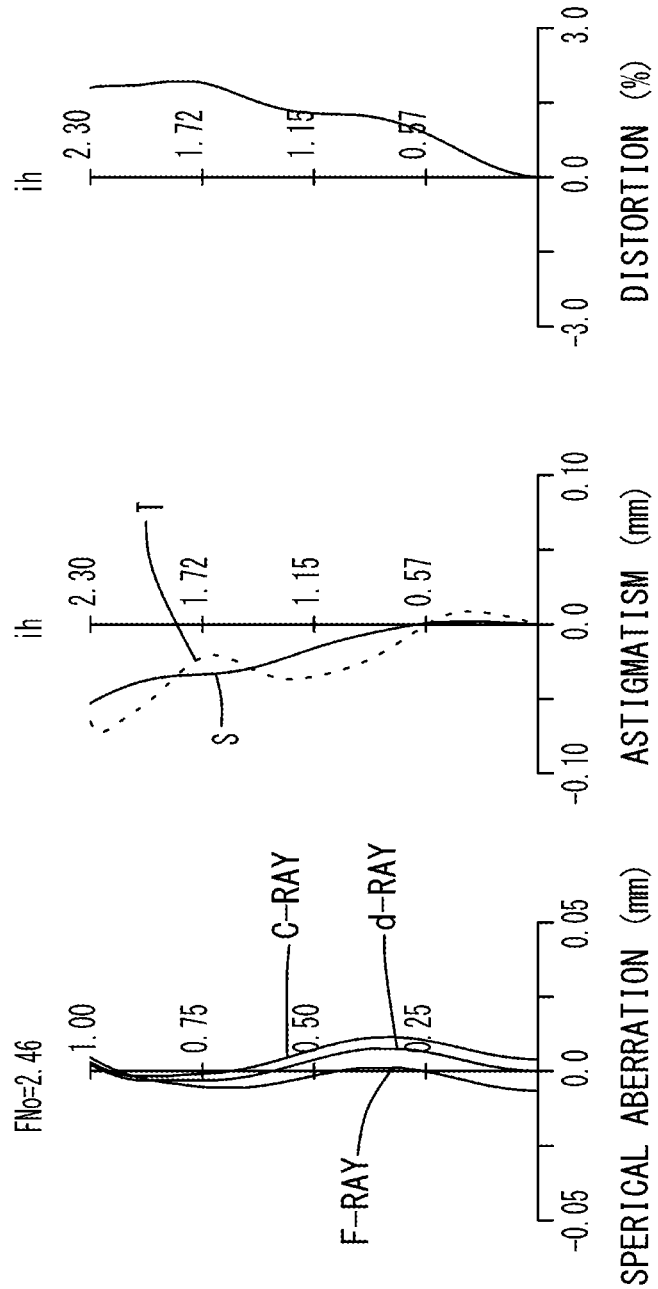
FIG. 4 shows spherical aberration, astigmatism, and distortion of the imaging lens in Example 2.
Figure 5:
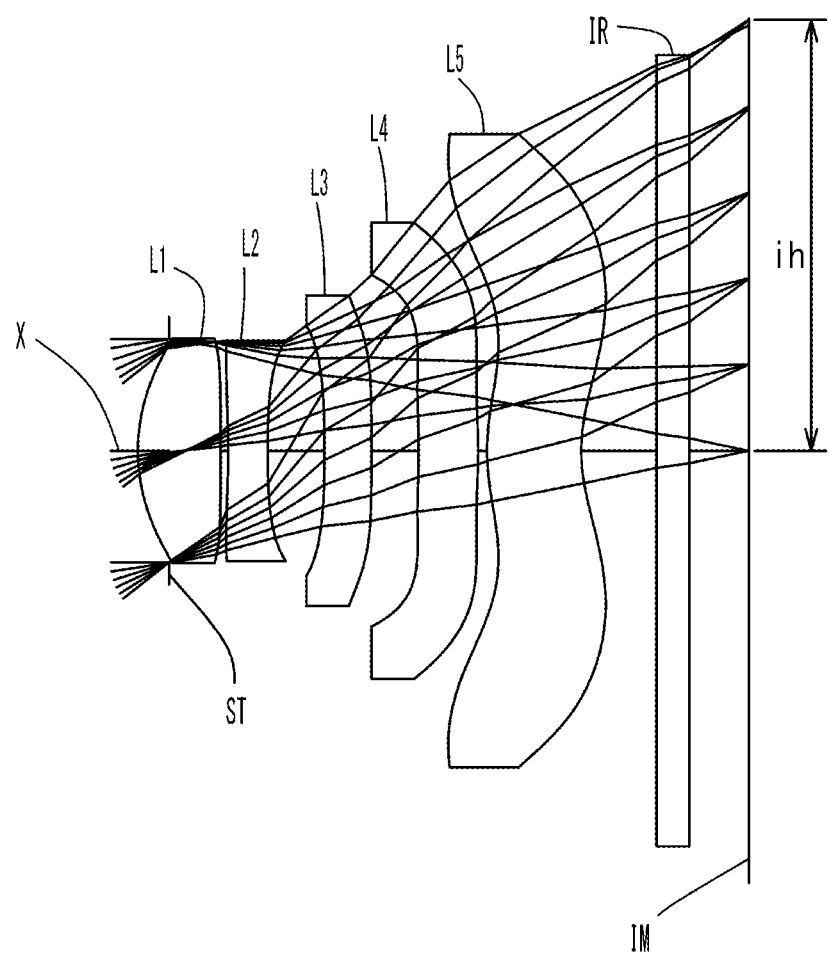
FIG. 5 is a schematic view showing the general configuration of an imaging lens in Example 3.

FIG. 4 shows spherical aberration (mm), astigmatism (mm), and distortion (%) of the imaging lens in Example 2. As shown in FIG. 4, each aberration is corrected properly.

In Example 2, total track length TTL is 3.24 mm, suggesting that the imaging lens is low-profile though it uses five constituent lenses. Also, the imaging lens offers a wide field of view of about 75 degrees and high brightness with an F-value of about 2.46.

Example 3

The basic lens data of Example 3 is shown in Table 3 below.

TABLE 3

Example 3 in mm f = 2.868
Fno = 2.41
ω(°) = 38.2
TTL = 3.19
ih = 2.30

Surface Data

| Surface No. i | Curvature Radius r | Surface Distance d | Refractive Index Nd | Abbe Number νd |
|---|---|---|---|---|
| (Object Surface) | Infinity | Infinity | | |
| 1 (Stop) | Infinity | −0.165 | | |
| 2* | 0.992 | 0.440 | 1.544 | 55.57 |
| 3* | −99.000 | 0.040 | | |
| 4* | −5.348 | 0.210 | 1.639 | 23.25 |
| 5* | 5.129 | 0.302 | | |
| 6* | −8.300 | 0.251 | 1.535 | 55.66 |
| 7* | −14.673 | 0.251 | | |
| 8* | −2.888 | 0.316 | 1.639 | 23.25 |
| 9* | −3.545 | 0.048 | | |
| 10* | 1.170 | 0.501 | 1.535 | 55.66 |
| 11* | 0.901 | 0.400 | | |
| 12 | Infinity | 0.175 | 1.517 | 64.20 |
| 13 | Infinity | 0.315 | | |
| Image Plane | Infinity | | | |

| Lens | Start Surface | Focal Length |
|---|---|---|
| Constituent Lens Data | | |
| 1 | 2 | 1.809 |
| 2 | 4 | −4.065 |
| 3 | 6 | −36.226 |
| 4 | 8 | −30.026 |
| 5 | 10 | −20.936 |
| Composite Focal Length | | |
| f2345 | | −2.336 |
| f45 | | −11.156 |

Aspheric Surface Data

| | 2nd Surface | 3rd Surface | 4th Surface | 5th Surface | 6th Surface |
|---|---|---|---|---|---|
| k | 0.000E+00 | 0.000E+00 | −2.786E+02 | 5.287E+01 | 0.000E+00 |
| A4 | −7.374E−02 | 5.200E−03 | 1.103E−01 | 2.695E−01 | −2.110E−01 |
| A6 | 2.730E−01 | −1.981E+00 | −1.097E+00 | 8.808E−01 | 1.980E−02 |
| A8 | −1.783E+00 | 1.222E+01 | 1.106E+01 | −3.739E+00 | −1.044E+01 |
| A10 | 3.586E+00 | −4.218E+01 | −4.183E+01 | 1.399E+01 | 7.813E+01 |
| A12 | −4.291E+00 | 6.013E+01 | 6.352E+01 | −3.130E+01 | −2.544E+02 |
| A14 | −4.355E+00 | −2.592E+01 | −2.292E+01 | 3.811E+01 | 3.999E+02 |
| A16 | 0.000E+00 | 0.000E+00 | 0.000E+00 | 0.000E+00 | −2.538E+02 |

| | 7th Surface | 8th Surface | 9th Surface | 10th Surface | 11th Surface |
|---|---|---|---|---|---|
| k | 0.000E+00 | −7.637E+00 | 4.099E+00 | −4.803E+00 | −5.518E+00 |
| A4 | 1.949E−01 | 1.413E+00 | 8.432E−01 | −6.617E−01 | −3.569E−01 |
| A6 | −2.366E+00 | −5.208E+00 | −2.067E+00 | 4.509E−01 | 2.811E−01 |
| A8 | 3.382E+00 | 1.058E+01 | 2.390E+00 | −1.868E−01 | −1.986E−01 |
| A10 | 5.673E+00 | −1.629E+01 | −1.756E+00 | 9.543E−02 | 1.103E−01 |

TABLE 3-continued

| | | | | | |
|---|---|---|---|---|---|
| A12 | −2.508E+01 | 1.683E+01 | 7.865E−01 | −4.513E−02 | −4.099E−02 |
| A14 | 3.183E+01 | −1.029E+01 | −1.801E−01 | 1.161E−02 | 8.267E−03 |
| A16 | −1.423E+01 | 2.704E+00 | 1.317E−02 | −1.159E−03 | −6.576E−04 |

As shown in Table 11, the imaging lens in Example 3 satisfies all the conditional expressions (1) to (8).

Figure 6:
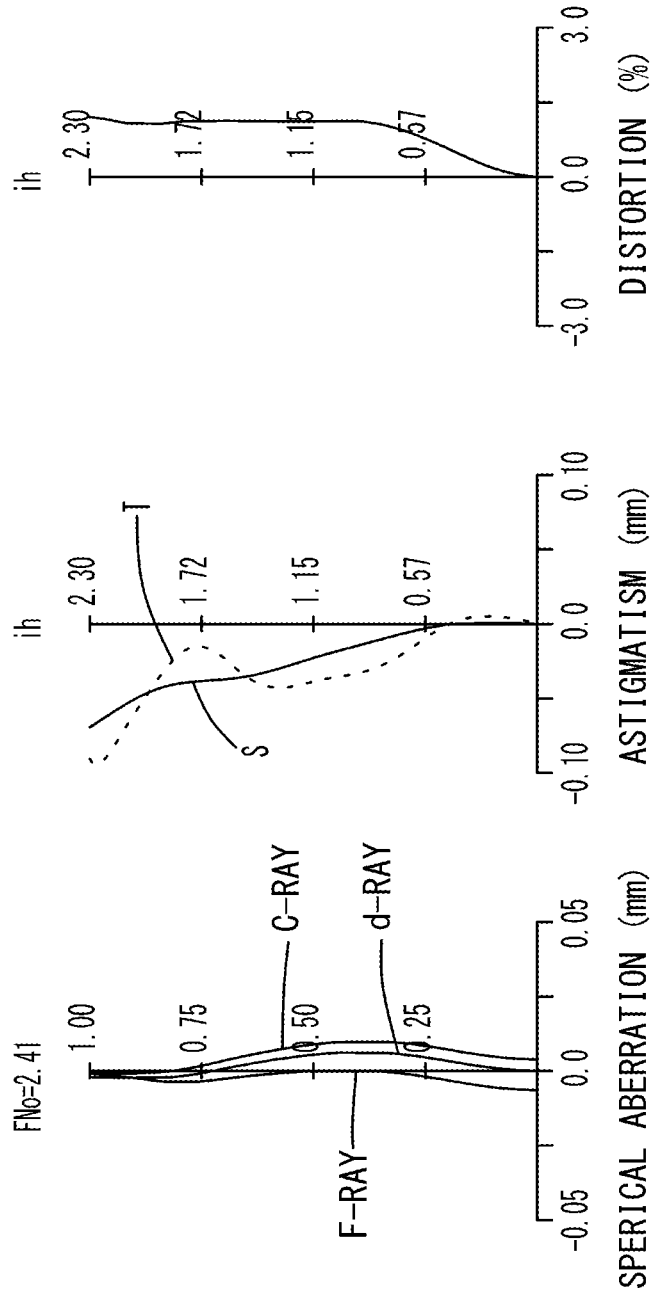
FIG. 6 shows spherical aberration, astigmatism, and distortion of the imaging lens in Example 3.
Figure 7:
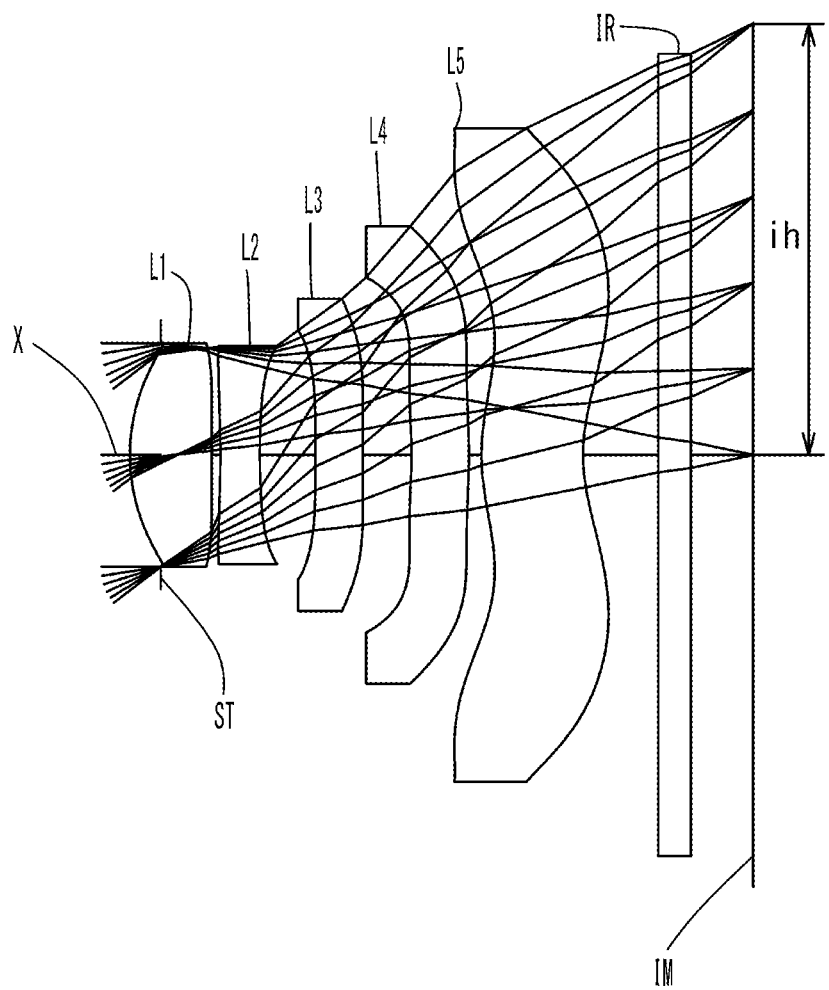
FIG. 7 is a schematic view showing the general configuration of an imaging lens in Example 4.

FIG. 6 shows spherical aberration (mm), astigmatism (mm), and distortion (%) of the imaging lens in Example 3. As shown in FIG. 6, each aberration is corrected properly.

In Example 3, total track length TTL is 3.19 mm, suggesting that the imaging lens is low-profile though it uses five constituent lenses. Also, the imaging lens offers a wide field of view of about 76 degrees and high brightness with an F-value of about 2.41.

Example 4

The basic lens data of Example 4 is shown in Table 4 below.

TABLE 4

Example 4 in mm f = 2.924
Fno = 2.46
ω(°) = 37.5
TTL = 3.25
ih = 2.30

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.165 | | |
| 2* | 0.995 | 0.436 | 1.544 | 55.57 |
| 3* | 41.133 | 0.046 | | |
| 4* | −6.090 | 0.210 | 1.639 | 23.25 |
| 5* | 4.868 | 0.297 | | |
| 6* | −22.161 | 0.250 | 1.535 | 55.66 |
| 7* | 97.647 | 0.260 | | |
| 8* | −2.347 | 0.305 | 1.639 | 23.25 |
| 9* | −3.103 | 0.067 | | |
| 10* | 1.167 | 0.540 | 1.535 | 55.66 |
| 11* | 0.966 | 0.400 | | |
| 12 | Infinity | 0.175 | 1.517 | 64.20 |
| 13 | Infinity | 0.327 | | |
| Image Plane | Infinity | | | |

| Lens | Start Surface | Focal Length |
|---|---|---|
| Constituent Lens Data | | |
| 1 | 2 | 1.867 |
| 2 | 4 | −4.202 |
| 3 | 6 | −33.749 |
| 4 | 8 | −17.900 |
| 5 | 10 | −166.856 |
| Composite Focal Length | | |
| f2345 | | −2.509 |
| f45 | | −13.687 |

Aspheric Surface Data

| | 2nd Surface | 3rd Surface | 4th Surface | 5th Surface | 6th Surface |
|---|---|---|---|---|---|
| k | 0.000E+00 | 0.000E+00 | −2.738E+02 | 5.747E+01 | 0.000E+00 |
| A4 | −5.537E−02 | −1.980E−02 | 8.902E−02 | 1.962E−01 | −2.985E−01 |
| A6 | 2.478E−01 | −2.022E+00 | −1.174E+00 | 8.527E−01 | 1.223E−01 |
| A8 | −1.793E+00 | 1.208E+01 | 1.112E+01 | −3.071E+00 | −1.066E+01 |
| A10 | 3.638E+00 | −4.154E+01 | −4.127E+01 | 1.244E+01 | 7.831E+01 |
| A12 | −4.291E+00 | 6.013E+01 | 6.352E+01 | −3.130E+01 | −2.544E+02 |
| A14 | −4.355E+00 | −2.592E+01 | −2.292E+01 | 3.811E+01 | 3.999E+02 |
| A16 | 0.000E+00 | 0.000E+00 | 0.000E+00 | 0.000E+00 | −2.538E+02 |

| | 7th Surface | 8th Surface | 9th Surface | 10th Surface | 11th Surface |
|---|---|---|---|---|---|
| k | 0.000E+00 | −1.659E+01 | 2.876E+00 | −2.903E+00 | −4.835E+00 |
| A4 | 2.091E−01 | 1.425E+00 | 8.654E−01 | −6.730E−01 | −3.501E−01 |
| A6 | −2.426E+00 | −5.216E+00 | −2.054E+00 | 4.491E−01 | 2.793E−01 |
| A8 | 3.410E+00 | 1.061E+01 | 2.376E+00 | −1.855E−01 | −1.994E−01 |

TABLE 4-continued

| | | | | | |
|---|---|---|---|---|---|
| A10 | 5.613E+00 | −1.625E+01 | −1.755E+00 | 9.506E−02 | 1.109E−01 |
| A12 | −2.507E+01 | 1.675E+01 | 7.901E−01 | −4.492E−02 | −4.080E−02 |
| A14 | 3.183E+01 | −1.029E+01 | −1.797E−01 | 1.156E−02 | 8.228E−03 |
| A16 | −1.423E+01 | 2.762E+00 | 1.276E−02 | −1.159E−03 | −6.693E−04 |

As shown in Table 11, the imaging lens in Example 4 satisfies all the conditional expressions (1) to (8).

Figure 8:
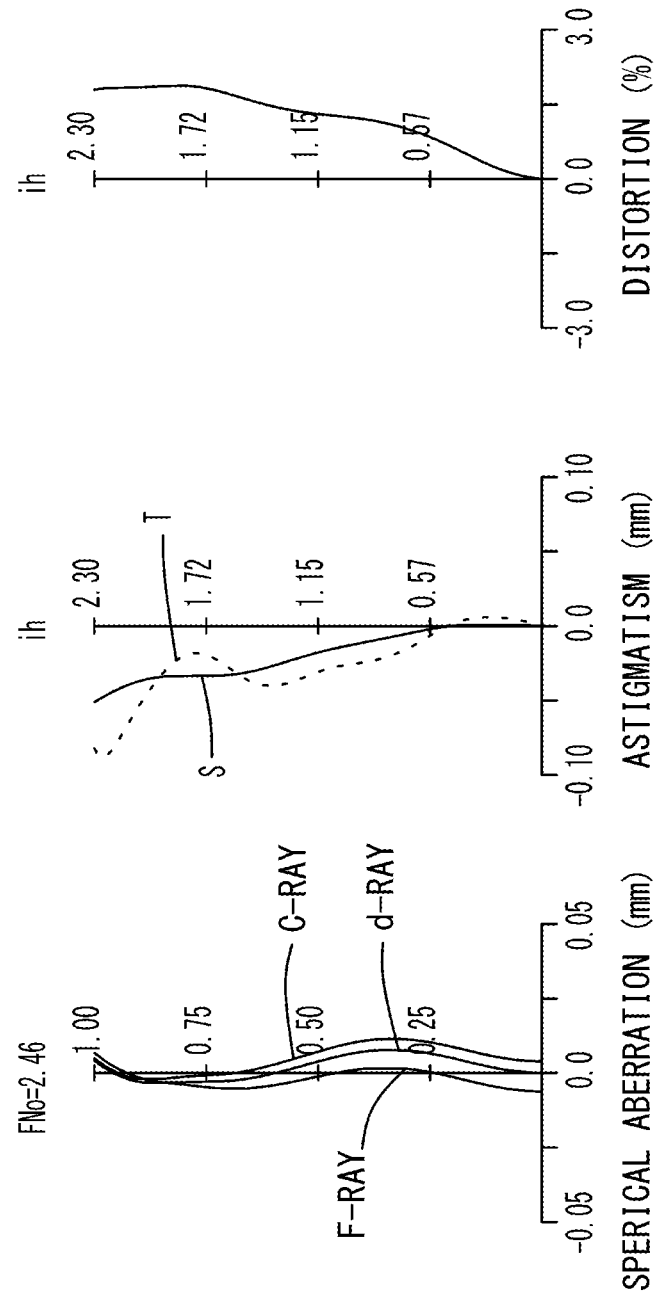
FIG. 8 shows spherical aberration, astigmatism, and distortion of the imaging lens in Example 4.
Figure 9:
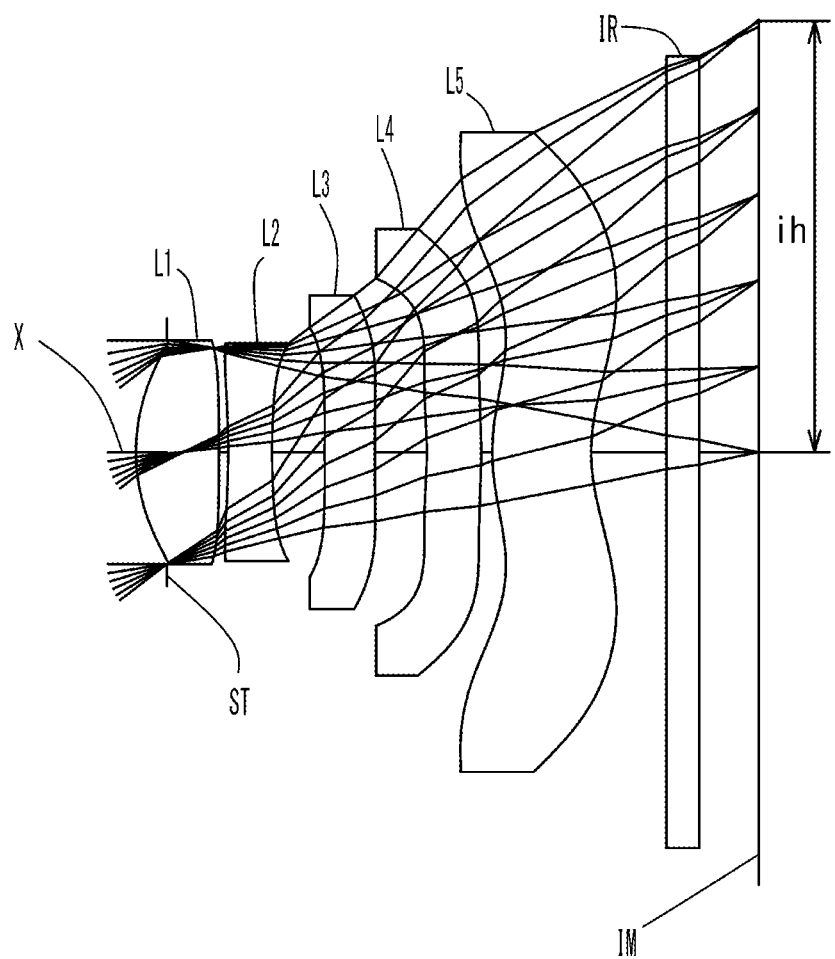
FIG. 9 is a schematic view showing the general configuration of an imaging lens in Example 5.

FIG. 8 shows spherical aberration (mm), astigmatism (mm), and distortion (%) of the imaging lens in Example 4. As shown in FIG. 8, each aberration is corrected properly.

In Example 4, total track length TTL is 3.25 mm, suggesting that the imaging lens is low-profile though it uses five constituent lenses. Also, the imaging lens offers a wide field of view of about 75 degrees and high brightness with an F-value of about 2.46.

Example 5

The basic lens data of Example 5 is shown in Table 5 below.

TABLE 5

| Example 5 in mm |
|---|
| f = 2.924 |
| Fno = 2.46 |
| ω(°) = 37.6 |
| TTL = 3.25 |
| ih = 2.30 |

Surface Data

| Surface No. i | Curvature Radius r | Surface Distance d | Refractive Index Nd | Abbe Number νd |
|---|---|---|---|---|
| (Object Surface) | Infinity | Infinity | | |
| 1 (Stop) | Infinity | −0.165 | | |
| 2* | 1.011 | 0.442 | 1.544 | 55.57 |
| 3* | −20.764 | 0.048 | | |
| 4* | −4.320 | 0.234 | 1.639 | 23.25 |
| 5* | 5.237 | 0.280 | | |
| 6* | 31.377 | 0.266 | 1.535 | 55.66 |
| 7* | 16.307 | 0.277 | | |
| 8* | −2.057 | 0.289 | 1.639 | 23.25 |
| 9* | −3.146 | 0.059 | | |
| 10* | 1.093 | 0.526 | 1.535 | 55.66 |
| 11* | 0.959 | 0.400 | | |
| 12 | Infinity | 0.175 | 1.517 | 64.17 |
| 13 | Infinity | 0.314 | | |
| Image Plane | Infinity | | | |

| Lens | Start Surface | Focal Length |
|---|---|---|
| Constituent Lens Data | | |
| 1 | 2 | 1.786 |
| 2 | 4 | −3.669 |
| 3 | 6 | −63.880 |
| 4 | 8 | −10.371 |
| 5 | 10 | 39.666 |
| Composite Focal Length | | |
| f2345 | | −2.271 |
| f45 | | −11.351 |

Aspheric Surface Data

| | 2nd Surface | 3rd Surface | 4th Surface | 5th Surface | 6th Surface |
|---|---|---|---|---|---|
| k | −4.189E−02 | 2.986E+01 | −1.209E+02 | 4.910E+01 | −4.616E−01 |
| A4 | −5.952E−02 | −1.130E−02 | 9.437E−02 | 2.280E−01 | −3.021E−01 |
| A6 | 2.377E−01 | −1.990E+00 | −1.087E+00 | 8.318E−01 | 1.140E−01 |
| A8 | −1.967E+00 | 1.229E+01 | 1.112E+01 | −3.161E+00 | −1.075E+00 |
| A10 | 3.870E+00 | −4.197E+01 | −4.137E+01 | 1.326E+01 | 7.839E+01 |
| A12 | −4.291E+00 | 6.014E+01 | 6.352E+01 | −3.130E+01 | −2.544E+02 |
| A14 | −4.355E+00 | −2.592E+01 | −2.292E+01 | 3.811E+01 | 3.999E+02 |
| A16 | 0.000E+00 | 0.000E+00 | 0.000E+00 | 0.000E+00 | −2.538E+02 |

| | 7th Surface | 8th Surface | 9th Surface | 10th Surface | 11th Surface |
|---|---|---|---|---|---|
| k | 2.145E−01 | −1.964E+01 | 3.181E+00 | −3.653E+00 | −4.871E+00 |
| A4 | 2.327E−01 | 1.437E+00 | 8.598E−01 | −6.750E−01 | −3.481E−01 |
| A6 | −2.511E+00 | −5.267E+00 | −2.063E+00 | 4.518E−01 | 2.734E−01 |

TABLE 5-continued

| A8  | 3.477E+00  | 1.059E+01  | 2.377E+00  | −1.851E−01 | −1.988E−01 |
| A10 | 5.533E+00  | −1.621E+01 | −1.759E+00 | 9.483E−02  | 1.111E−01  |
| A12 | −2.508E+01 | 1.668E+01  | 7.859E−01  | −4.499E−02 | −4.075E−02 |
| A14 | 3.183E+01  | −1.028E+01 | −1.794E−01 | 1.158E−02  | 8.226E−03  |
| A16 | −1.423E+01 | 2.704E+00  | 1.489E−02  | −1.159E−03 | −6.732E−04 |

As shown in Table 11, the imaging lens in Example 5 satisfies all the conditional expressions (1) to (8).

Figure 10:
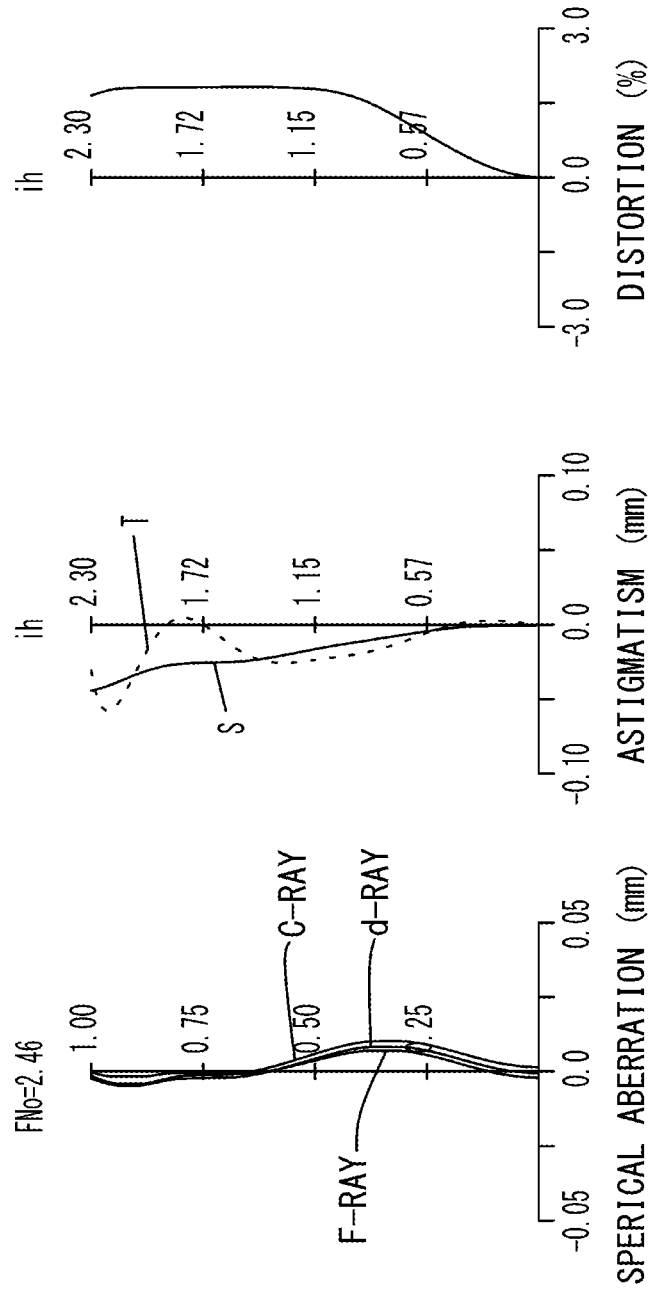
FIG. 10 shows spherical aberration, astigmatism, and distortion of the imaging lens in Example 5.
Figure 11:
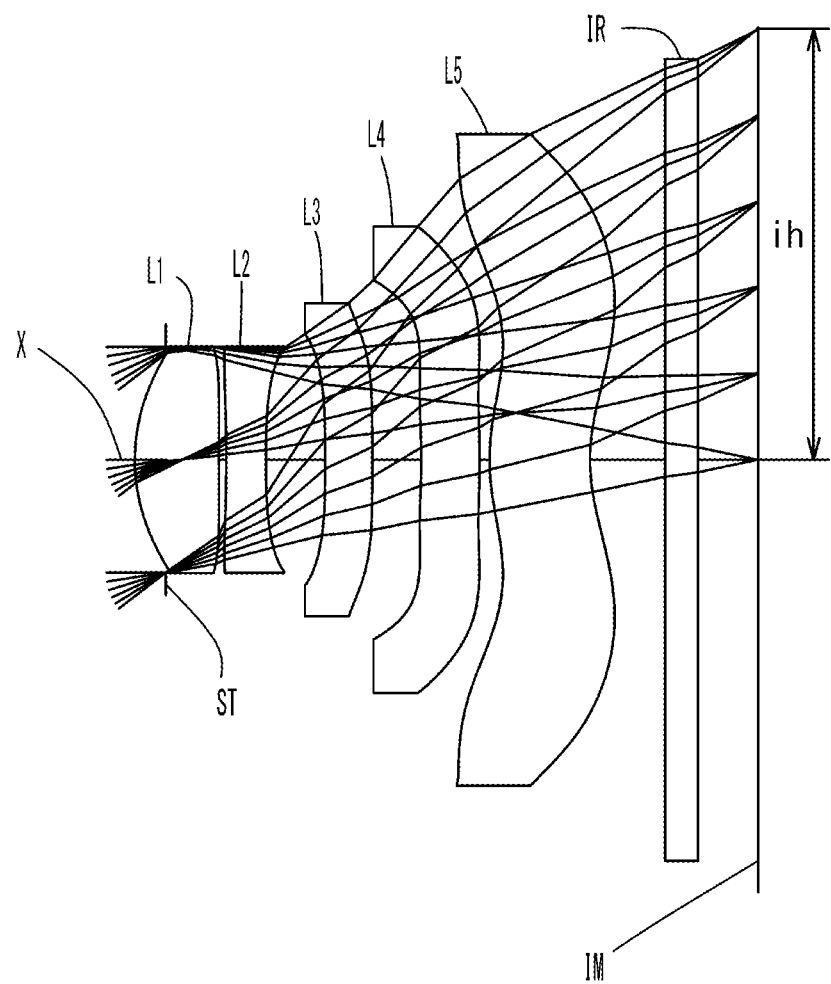
FIG. 11 is a schematic view showing the general configuration of an imaging lens in Example 6.

FIG. 10 shows spherical aberration (mm), astigmatism (mm), and distortion (%) of the imaging lens in Example 5. As shown in FIG. 10, each aberration is corrected properly.

In Example 5, total track length TTL is 3.25 mm, suggesting that the imaging lens is low-profile though it uses five constituent lenses. Also, the imaging lens offers a wide field of view of about 75 degrees and high brightness with an F-value of about 2.46.

Example 6

The basic lens data of Example 6 is shown in Table 6 below.

TABLE 6

| Example 6 in mm |
| --- |
| f = 2.925 |
| Fno = 2.44 |
| ω(°) = 37.5 |
| TTL = 3.26 |
| ih = 2.30 |

Surface Data

| Surface No. i | Curvature Radius r | Surface Distance d | Refractive Index Nd | Abbe Number νd |
| --- | --- | --- | --- | --- |
| (Object Surface) | Infinity | Infinity | | |
| 1 (Stop) | Infinity | −0.165 | | |
| 2* | 0.999 | 0.447 | 1.544 | 55.57 |
| 3* | 30.714 | 0.040 | | |
| 4* | −6.554 | 0.210 | 1.639 | 23.25 |
| 5* | 5.101 | 0.317 | | |
| 6* | −7.995 | 0.250 | 1.535 | 55.66 |
| 7* | −12.724 | 0.260 | | |
| 8* | −2.620 | 0.310 | 1.639 | 23.25 |
| 9* | −4.159 | 0.053 | | |
| 10* | 1.137 | 0.534 | 1.535 | 55.66 |
| 11* | 0.971 | 0.400 | | |
| 12 | Infinity | 0.175 | 1.517 | 64.20 |
| 13 | Infinity | 0.316 | | |
| Image Plane | Infinity | | | |

| Lens | Start Surface | Focal Length |
| --- | --- | --- |
| Constituent Lens Data | | |
| 1 | 2 | 1.888 |
| 2 | 4 | −4.457 |
| 3 | 6 | −40.969 |
| 4 | 8 | −12.023 |
| 5 | 10 | 102.339 |
| Composite Focal Length | | |
| f2345 | | −2.537 |
| f45 | | −11.256 |

Aspheric Surface Data

| | 2nd Surface | 3rd Surface | 4th Surface | 5th Surface | 6th Surface |
| --- | --- | --- | --- | --- | --- |
| k   | 0.000E+00  | 0.000E+00  | −3.755E+02 | 6.297E+01  | 0.000E+00  |
| A4  | −5.586E−02 | −1.468E−02 | 8.236E−02  | 2.014E−01  | −2.249E−01 |
| A6  | 2.632E−01  | −2.013E+00 | −1.193E+00 | 8.272E−01  | −6.967E−02 |
| A8  | −1.776E+00 | 1.207E+01  | 1.106E+01  | −3.188E+00 | −1.043E+01 |
| A10 | 3.751E+00  | −4.162E+01 | −4.155E+01 | 1.229E+01  | 7.812E+01  |
| A12 | −3.968E+00 | 6.010E+01  | 6.387E+01  | −3.111E+01 | −2.544E+02 |
| A14 | −4.355E+00 | −2.533E+01 | −2.310E+01 | 3.811E+01  | 3.999E+02  |
| A16 | 0.000E+00  | 0.000E+00  | 0.000E+00  | 0.000E+00  | −2.538E+02 |

| | 7th Surface | 8th Surface | 9th Surface | 10th Surface | 11th Surface |
| --- | --- | --- | --- | --- | --- |
| k  | 0.000E+00 | −2.945E+00 | 4.490E+00 | −3.224E+00 | −4.798E+00 |
| A4 | 2.354E−01 | 1.493E+00  | 8.280E−01 | −6.694E−01 | −3.587E−01 |

TABLE 6-continued

| | | | | | |
|---|---|---|---|---|---|
| A6 | −2.464E+00 | −5.260E+00 | −2.046E+00 | 4.487E−01 | 2.817E−01 |
| A8 | 3.428E+00 | 1.060E+01 | 2.379E+00 | −1.860E−01 | −1.990E−01 |
| A10 | 5.669E+00 | −1.628E+01 | −1.758E+00 | 9.488E−02 | 1.108E−01 |
| A12 | −2.508E+01 | 1.683E+01 | 7.894E−01 | −4.493E−02 | −4.086E−02 |
| A14 | 3.182E+01 | −1.030E+01 | −1.799E−01 | 1.166E−02 | 8.234E−03 |
| A16 | −1.415E+01 | 2.745E+00 | 1.284E−02 | −1.184E−03 | −6.689E−04 |

As shown in Table 11, the imaging lens in Example 6 satisfies all the conditional expressions (1) to (8).

Figure 12:
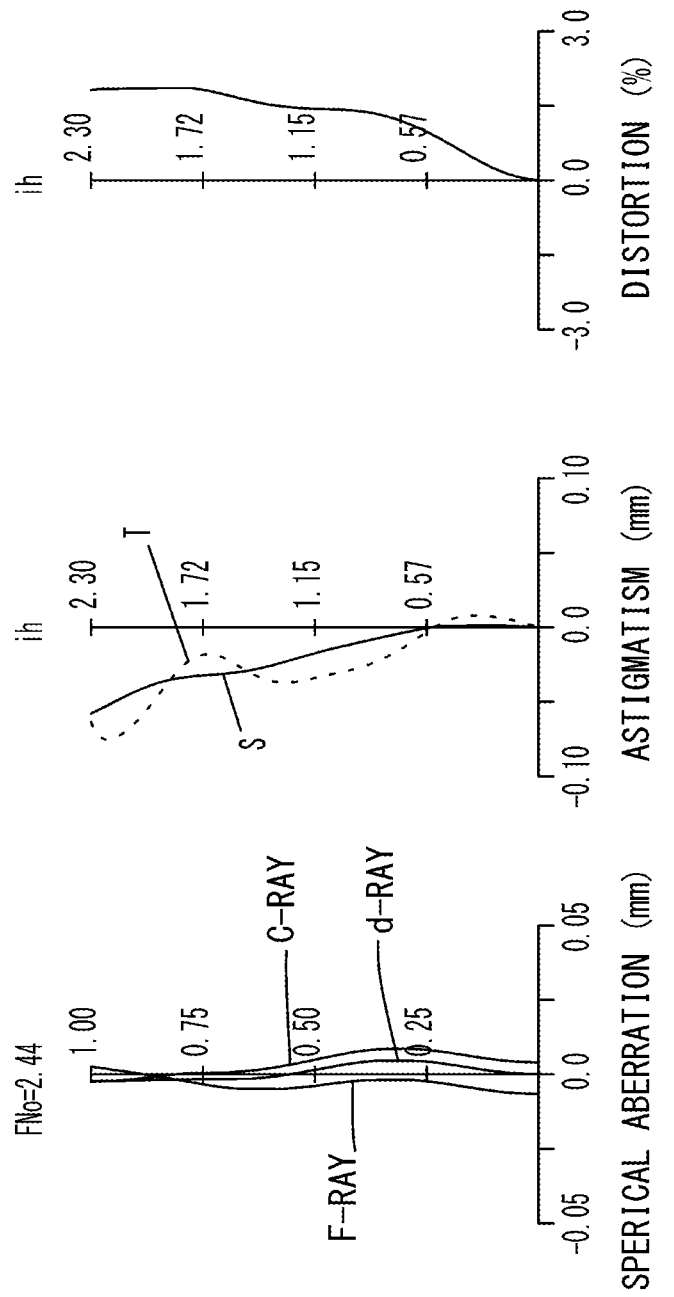
FIG. 12 shows spherical aberration, astigmatism, and distortion of the imaging lens in Example 6.
Figure 13:
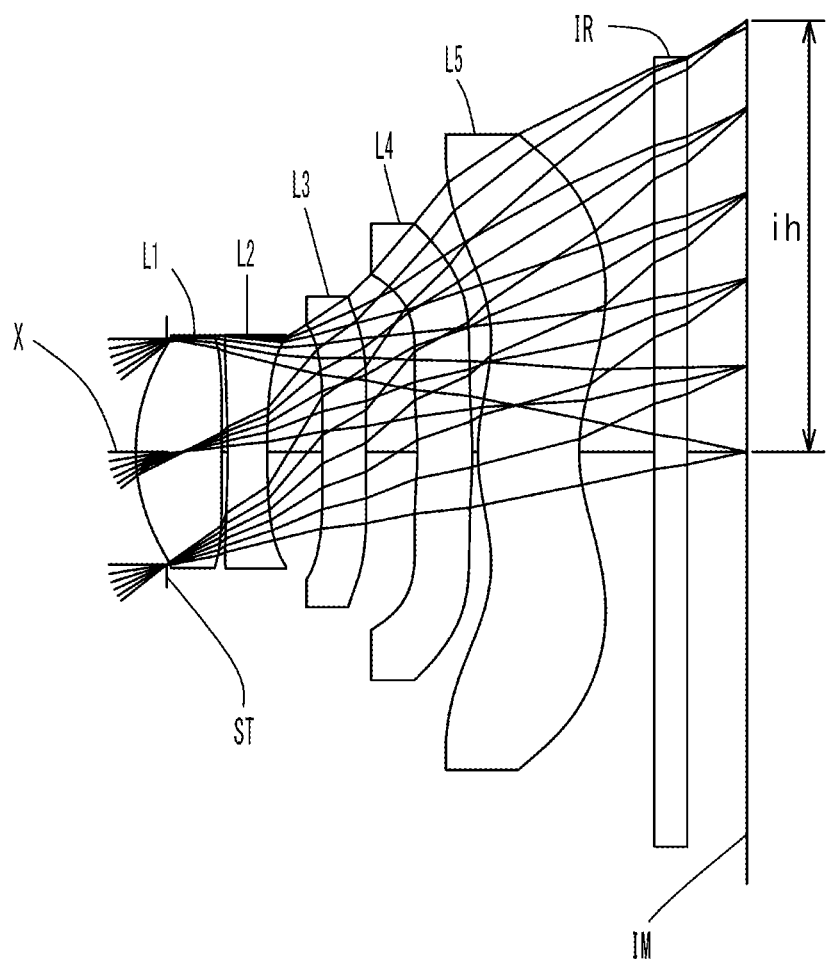
FIG. 13 is a schematic view showing the general configuration of an imaging lens in Example 7.

FIG. 12 shows spherical aberration (mm), astigmatism (mm), and distortion (%) of the imaging lens in Example 6. As shown in FIG. 12, each aberration is corrected properly.

In Example 6, total track length TTL is 3.26 mm, suggesting that the imaging lens is low-profile though it uses five constituent lenses. Also, the imaging lens offers a wide field of view of about 75 degrees and high brightness with an F-value of about 2.44.

Example 7

The basic lens data of Example 7 is shown in Table 7 below.

TABLE 7

| Example 7 in mm |
|---|
| f = 2.839 |
| Fno = 2.41 |
| ω(°) = 38.4 |
| TTL = 3.19 |
| ih = 2.30 |

Surface Data

| Surface No. i | Curvature Radius r | Surface Distance d | Refractive Index Nd | Abbe Number νd |
|---|---|---|---|---|
| (Object Surface) | Infinity | Infinity | | |
| 1 (Stop) | Infinity | −0.165 | | |
| 2* | 1.008 | 0.456 | 1.544 | 55.57 |
| 3* | 42.064 | 0.033 | | |
| 4* | −6.408 | 0.210 | 1.639 | 23.25 |
| 5* | 4.990 | 0.295 | | |
| 6* | 95.000 | 0.230 | 1.535 | 55.66 |
| 7* | 30.114 | 0.274 | | |
| 8* | −1.895 | 0.292 | 1.639 | 23.25 |
| 9* | −2.595 | 0.030 | | |
| 10* | 1.061 | 0.539 | 1.535 | 55.66 |
| 11* | 0.891 | 0.400 | | |
| 12 | Infinity | 0.175 | 1.517 | 64.20 |
| 13 | Infinity | 0.314 | | |
| Image Plane | Infinity | | | |

| Lens | Start Surface | Focal Length |
|---|---|---|
| Constituent Lens Data | | |
| 1 | 2 | 1.891 |
| 2 | 4 | −4.359 |
| 3 | 6 | −82.543 |
| 4 | 8 | −13.117 |
| 5 | 10 | 101.513 |
| Composite Focal Length | | |
| f2345 | | −2.648 |
| f45 | | −12.218 |

Aspheric Surface Data

| | 2nd Surface | 3rd Surface | 4th Surface | 5th Surface | 6th Surface |
|---|---|---|---|---|---|
| k | 0.000E+00 | 0.000E+00 | −2.622E+02 | 5.659E+01 | 0.000E+00 |
| A4 | −6.806E−02 | −2.978E−02 | 8.556E−02 | 1.730E−01 | −2.120E−01 |
| A6 | 2.877E−01 | −1.972E+00 | −1.237E+00 | 8.373E−01 | −2.195E−01 |
| A8 | −1.768E+00 | 1.209E+01 | 1.113E+01 | −2.953E+00 | −1.012E+01 |
| A10 | 3.860E+00 | −4.190E+01 | −4.195E+01 | 1.080E+01 | 7.791E+01 |
| A12 | −4.148E+00 | 5.998E+01 | 6.417E+01 | −2.938E+01 | −2.544E+02 |

TABLE 7-continued

| | | | | | |
|---|---|---|---|---|---|
| A14 | −4.355E+00 | −2.499E+01 | −2.377E+01 | 3.811E+01 | 3.999E+02 |
| A16 | 0.000E+00 | 0.000E+00 | 0.000E+00 | 0.000E+00 | −2.538E+02 |

| | 7th Surface | 8th Surface | 9th Surface | 10th Surface | 11th Surface |
|---|---|---|---|---|---|
| k | 0.000E+00 | −2.011E+01 | −6.981E+00 | −4.876E+00 | −5.237E+00 |
| A4 | 2.142E−01 | 1.480E+00 | 8.858E−01 | −6.458E−01 | −3.403E−01 |
| A6 | −2.396E+00 | −5.356E+00 | −2.096E+00 | 4.483E−01 | 2.730E−01 |
| A8 | 3.280E+00 | 1.081E+01 | 2.373E+00 | −1.879E−01 | −1.995E−01 |
| A10 | 5.637E+00 | −1.631E+01 | −1.750E+00 | 9.458E−02 | 1.113E−01 |
| A12 | −2.494E+01 | 1.661E+01 | 7.937E−01 | −4.484E−02 | −4.106E−02 |
| A14 | 3.177E+01 | −1.047E+01 | −1.777E−01 | 1.173E−02 | 8.246E−03 |
| A16 | −1.401E+01 | 3.062E+00 | 1.058E−02 | −1.197E−03 | −6.594E−04 |

As shown in Table 11, the imaging lens in Example 7 satisfies all the conditional expressions (1) to (8).

Figure 14:
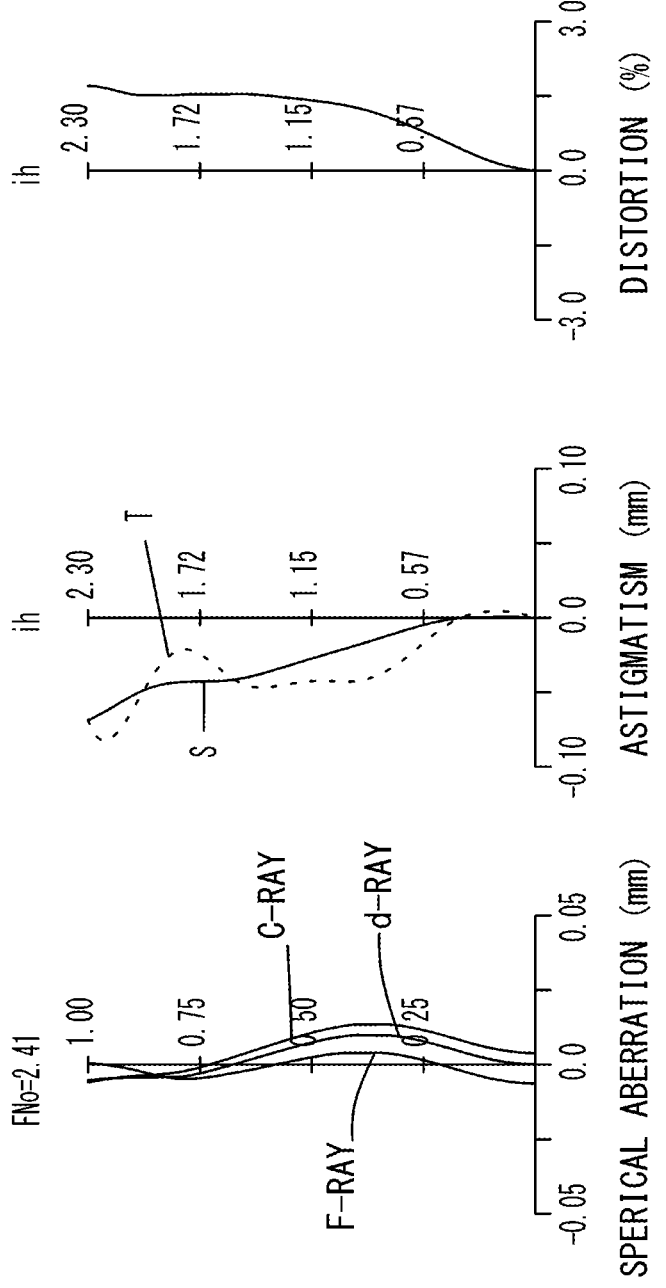
FIG. 14 shows spherical aberration, astigmatism, and distortion of the imaging lens in Example 7.
Figure 15:
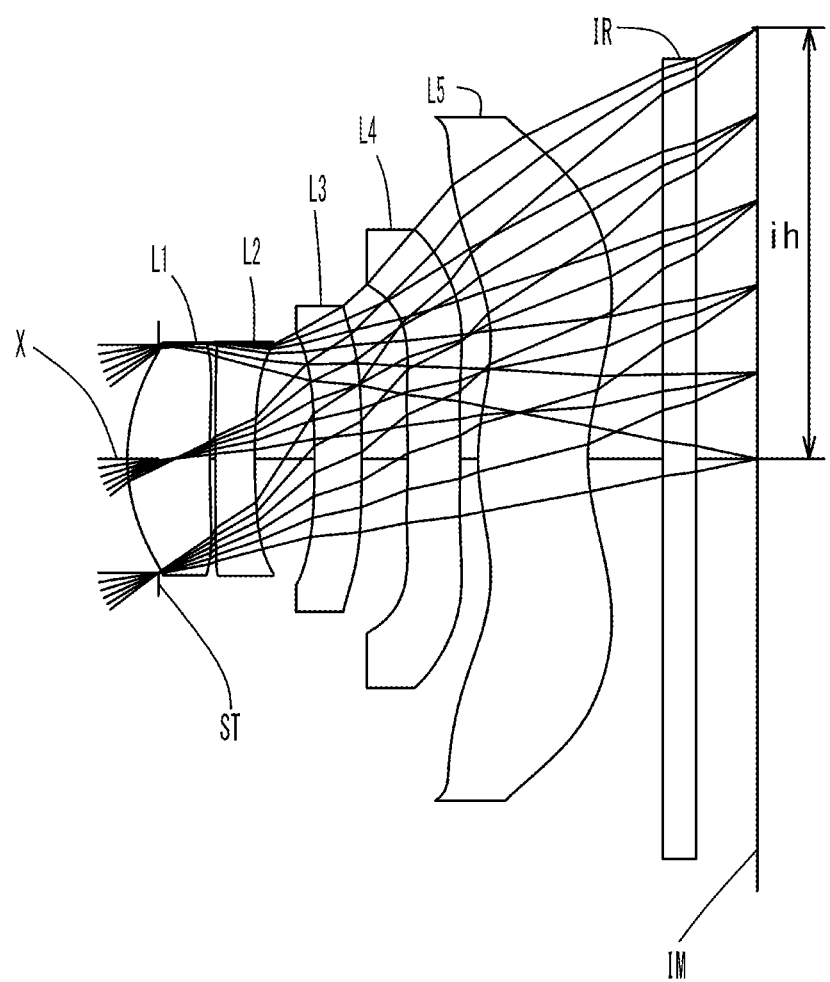
FIG. 15 is a schematic view showing the general configuration of an imaging lens in Example 8.

FIG. 14 shows spherical aberration (mm), astigmatism (mm), and distortion (%) of the imaging lens in Example 7. As shown in FIG. 14, each aberration is corrected properly.

In Example 7, total track length TTL is 3.19 mm, suggesting that the imaging lens is low-profile though it uses five constituent lenses. Also, the imaging lens offers a wide field of view of about 77 degrees and high brightness with an F-value of about 2.41.

Example 8

The basic lens data of Example 8 is shown in Table 8 below.

TABLE 8

Example 8 in mm f = 2.949
Fno = 2.43
ω(°) = 37.3
TTL = 3.29
ih = 2.30

Surface Data

| Surface No. i | Curvature Radius r | Surface Distance d | Refractive Index Nd | Abbe Number νd |
|---|---|---|---|---|
| (Object Surface) | Infinity | Infinity | | |
| 1 (Stop) | Infinity | −0.165 | | |
| 2* | 1.018 | 0.438 | 1.544 | 55.57 |
| 3* | 5.930 | 0.031 | | |
| 4* | 95.000 | 0.210 | 1.635 | 23.97 |
| 5* | 4.866 | 0.318 | | |
| 6* | −5.968 | 0.250 | 1.614 | 25.58 |
| 7* | −8.677 | 0.246 | | |
| 8* | −3.085 | 0.278 | 1.614 | 25.58 |
| 9* | −6.702 | 0.095 | | |
| 10* | 1.240 | 0.585 | 1.535 | 55.66 |
| 11* | 1.102 | 0.400 | | |
| 12 | Infinity | 0.175 | 1.517 | 64.20 |
| 13 | Infinity | 0.322 | | |
| Image Plane | Infinity | | | |

| Lens | Start Surface | Focal Length |
|---|---|---|
| Constituent Lens Data | | |
| 1 | 2 | 2.192 |
| 2 | 4 | −8.085 |
| 3 | 6 | −32.255 |
| 4 | 8 | −9.589 |
| 5 | 10 | 38.613 |
| Composite Focal Length | | |
| f2345 | | −3.490 |
| f45 | | −10.359 |

Aspheric Surface Data

| | 2nd Surface | 3rd Surface | 4th Surface | 5th Surface | 6th Surface |
|---|---|---|---|---|---|
| k | 0.000E+00 | 0.000E+00 | 0.000E+00 | 5.627E+01 | 0.000E+00 |
| A4 | −4.969E−02 | −7.269E−02 | 9.271E−02 | 1.289E−01 | −1.513E−01 |
| A6 | 2.309E−01 | −2.043E+00 | −1.213E+00 | 8.378E−01 | −7.550E−02 |
| A8 | −1.870E+00 | 1.197E+01 | 1.095E+01 | −2.463E+00 | −1.040E+01 |
| A10 | 4.287E+00 | −4.139E+01 | −4.177E+01 | 1.023E+01 | 7.846E+01 |

TABLE 8-continued

| | | | | | |
|---|---|---|---|---|---|
| A12 | −4.180E+00 | 6.007E+01 | 6.389E+01 | −3.111E+01 | −2.544E+02 |
| A14 | −4.355E+00 | −2.533E+01 | −2.310E+01 | 3.811E+01 | 3.999E+02 |
| A16 | 0.000E+00 | 0.000E+00 | 0.000E+00 | 0.000E+00 | −2.538E+02 |

| | 7th Surface | 8th Surface | 9th Surface | 10th Surface | 11th Surface |
|---|---|---|---|---|---|
| k | 0.000E+00 | 3.318E−01 | 1.673E+01 | −2.337E+00 | −4.193E+00 |
| A4 | 2.557E−01 | 1.474E+00 | 7.663E−01 | −6.643E−01 | −3.499E−01 |
| A6 | −2.342E+00 | −5.303E+00 | −2.023E+00 | 4.459E−01 | 2.763E−01 |
| A8 | 3.369E+00 | 1.066E+01 | 2.397E+00 | −1.871E−01 | −1.983E−01 |
| A10 | 5.580E+00 | −1.642E+01 | −1.747E+00 | 9.453E−02 | 1.107E−01 |
| A12 | −2.491E+01 | 1.740E+01 | 7.842E−01 | −4.483E−02 | −4.099E−02 |
| A14 | 3.181E+01 | −1.098E+01 | −1.833E−01 | 1.170E−02 | 8.271E−03 |
| A16 | −1.420E+01 | 2.962E+00 | 1.274E−02 | −1.185E−03 | −6.698E−04 |

As shown in Table 11, the imaging lens in Example 8 satisfies all the conditional expressions (1) to (8).

Figure 16:
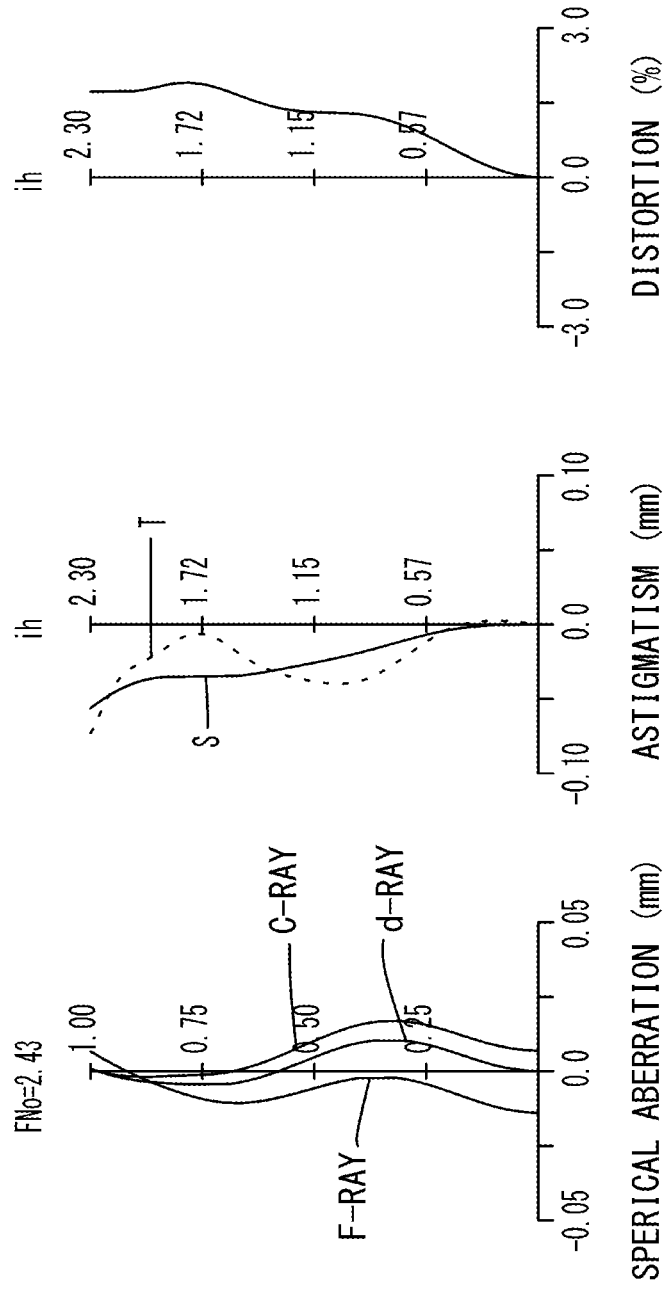
FIG. 16 shows spherical aberration, astigmatism, and distortion of the imaging lens in Example 8.
Figure 17:
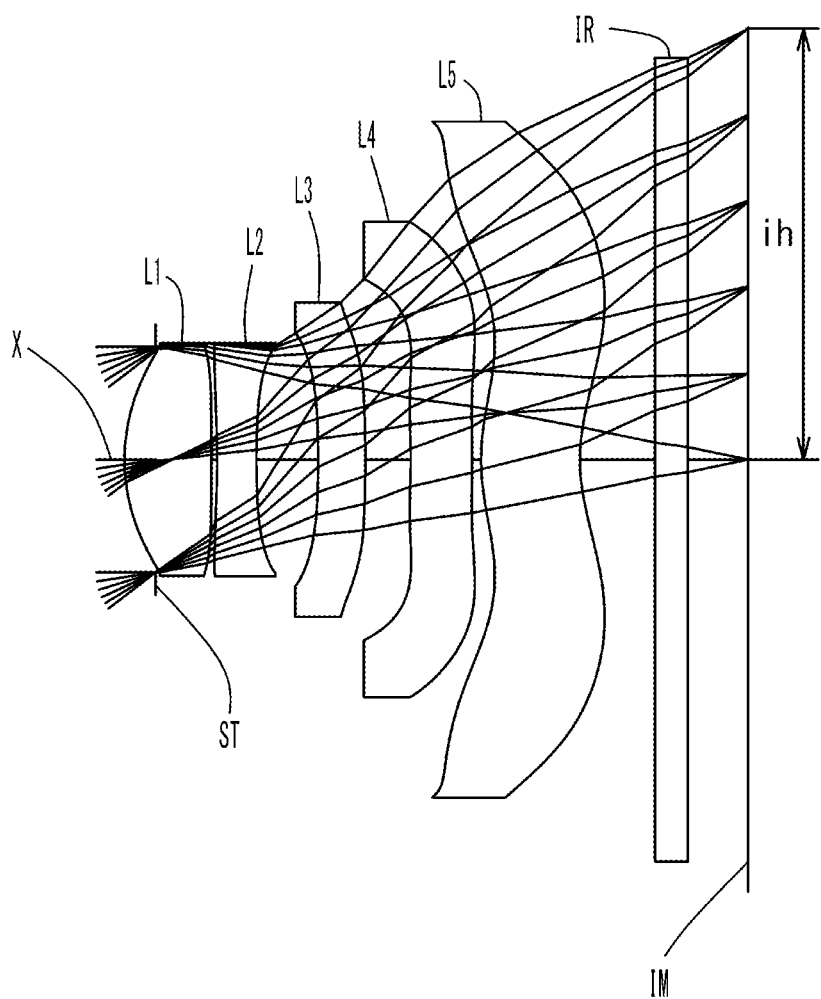
FIG. 17 is a schematic view showing the general configuration of an imaging lens in Example 9.

FIG. 16 shows spherical aberration (mm), astigmatism (mm), and distortion (%) of the imaging lens in Example 8. As shown in FIG. 16, each aberration is corrected properly.

In Example 8, total track length TTL is 3.29 mm, suggesting that the imaging lens is low-profile though it uses five constituent lenses. Also, the imaging lens offers a wide field of view of about 75 degrees and high brightness with an F-value of about 2.43.

Example 9

The basic lens data of Example 9 is shown in Table 9 below.

TABLE 9

| Example 9 in mm |
|---|
| f = 2.921 |
| Fno = 2.43 |
| ω(°) = 37.6 |
| TTL = 3.25 |
| ih = 2.30 |

| Surface Data | | | | |
|---|---|---|---|---|
| Surface No. i | Curvature Radius r | Surface Distance d | Refractive Index Nd | Abbe Number νd |
| (Object Surface) | Infinity | Infinity | | |
| 1 (Stop) | Infinity | −0.165 | | |
| 2* | 1.010 | 0.461 | 1.544 | 55.57 |
| 3* | −82.593 | 0.031 | | |
| 4* | −5.660 | 0.210 | 1.639 | 23.25 |
| 5* | 5.131 | 0.329 | | |
| 6* | −5.149 | 0.250 | 1.535 | 55.66 |
| 7* | −7.912 | 0.243 | | |
| 8* | −3.358 | 0.327 | 1.535 | 55.66 |
| 9* | −6.597 | 0.047 | | |
| 10* | 1.149 | 0.526 | 1.535 | 55.66 |
| 11* | 0.986 | 0.400 | | |
| 12 | Infinity | 0.175 | 1.517 | 64.20 |
| 13 Image Plane | Infinity | 0.314 | | |

| Lens | Start Surface | Focal Length |
|---|---|---|
| Constituent Lens Data | | |
| 1 | 2 | 1.838 |
| 2 | 4 | −4.180 |
| 3 | 6 | −28.471 |
| 4 | 8 | −13.251 |
| 5 | 10 | 101.448 |
| Composite Focal Length | | |
| f2345 | | −2.402 |
| f45 | | −12.616 |

| Aspheric Surface Data | | | | | |
|---|---|---|---|---|---|
| | 2nd Surface | 3rd Surface | 4th Surface | 5th Surface | 6th Surface |
| k | 0.000E+00 | 0.000E+00 | −2.002E+02 | 6.289E+01 | 0.000E+00 |
| A4 | −5.363E−02 | −1.045E−03 | 1.061E−01 | 2.046E−01 | −1.950E−01 |
| A6 | 2.613E−01 | −1.957E+00 | −1.216E+00 | 7.893E−01 | −1.227E−01 |
| A8 | −1.770E+00 | 1.196E+01 | 1.097E+01 | −3.162E+00 | −1.036E+01 |

TABLE 9-continued

| | | | | | |
|---|---|---|---|---|---|
| A10 | 3.979E+00 | −4.169E+01 | −4.178E+01 | 1.193E+01 | 7.827E+01 |
| A12 | −4.181E+00 | 6.007E+01 | 6.389E+01 | −3.111E+01 | −2.544E+02 |
| A14 | −4.355E+00 | −2.533E+01 | −2.310E+01 | 3.811E+01 | 3.999E+02 |
| A16 | 0.000E+00 | 0.000E+00 | 0.000E+00 | 0.000E+00 | −2.538E+02 |

| | 7th Surface | 8th Surface | 9th Surface | 10th Surface | 11th Surface |
|---|---|---|---|---|---|
| k | 0.000E+00 | 8.600E−01 | 1.033E+01 | −2.599E+00 | −4.593E+00 |
| A4 | 2.149E−01 | 1.481E+00 | 8.100E−01 | −6.781E−01 | −3.599E−01 |
| A6 | −2.431E+00 | −5.268E+00 | −2.042E+00 | 4.470E−01 | 2.813E−01 |
| A8 | 3.475E+00 | 1.055E+01 | 2.374E+00 | −1.859E−01 | −1.979E−01 |
| A10 | 5.703E+00 | −1.631E+01 | −1.753E+00 | 9.474E−02 | 1.106E−01 |
| A12 | −2.509E+01 | 1.739E+01 | 7.904E−01 | −4.493E−02 | −4.088E−02 |
| A14 | 3.181E+01 | −1.098E+01 | −1.816E−01 | 1.167E−02 | 8.230E−03 |
| A16 | −1.418E+01 | 2.960E+00 | 1.241E−02 | −1.181E−03 | −6.694E−04 |

As shown in Table 11, the imaging lens in Example 9 satisfies all the conditional expressions (1) to (8).

Figure 18:
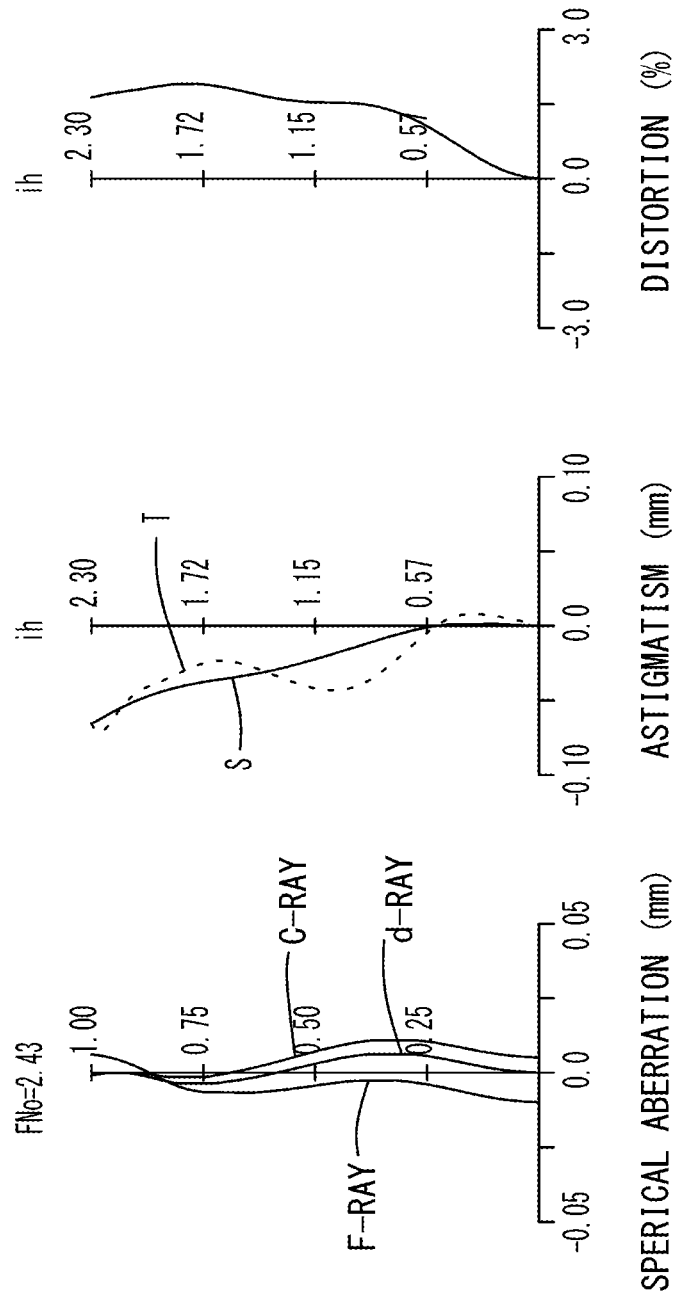
FIG. 18 shows spherical aberration, astigmatism, and distortion of the imaging lens in Example 9.
Figure 19:
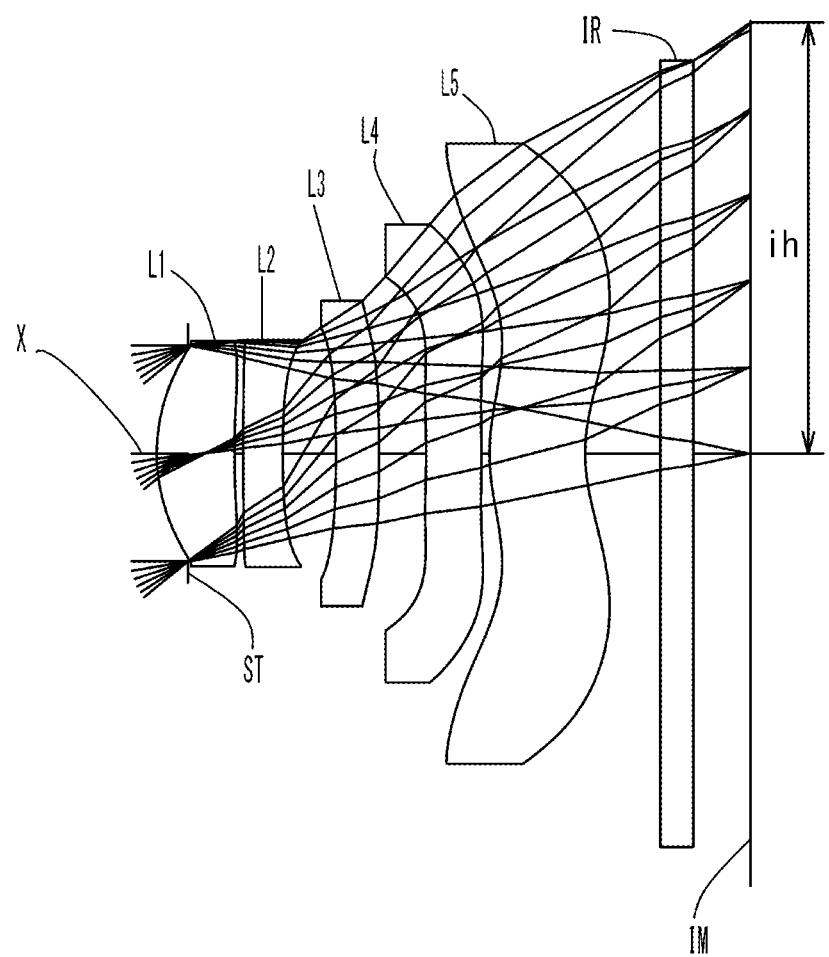
FIG. 19 is a schematic view showing the general configuration of an imaging lens in Example 10.

FIG. 18 shows spherical aberration (mm), astigmatism (mm), and distortion (%) of the imaging lens in Example 9. As shown in FIG. 18, each aberration is corrected properly.

In Example 9, total track length TTL is 3.25 mm, suggesting that the imaging lens is low-profile though it uses five constituent lenses. Also, the imaging lens offers a wide field of view of about 75 degrees and high brightness with an F-value of about 2.43.

Example 10

The basic lens data of Example 10 is shown in Table 10 below.

TABLE 10

Example 10 in mm f = 2.760
Fno = 2.41
ω(°) = 39.7
TTL = 3.09
ih = 2.30

Surface Data

| Surface No. i | Curvature Radius r | Surface Distance d | Refractive Index Nd | Abbe Number νd |
|---|---|---|---|---|
| (Object Surface) | Infinity | Infinity | | |
| 1 (Stop) | Infinity | −0.165 | | |
| 2* | 0.979 | 0.413 | 1.544 | 55.57 |
| 3* | 4.515 | 0.047 | | |
| 4* | 89.131 | 0.210 | 1.639 | 23.25 |
| 5* | 5.241 | 0.283 | | |
| 6* | −7.535 | 0.229 | 1.535 | 55.66 |
| 7* | −8.543 | 0.251 | | |
| 8* | −3.233 | 0.294 | 1.639 | 23.25 |
| 9* | −6.318 | 0.042 | | |
| 10* | 1.086 | 0.509 | 1.535 | 55.66 |
| 11* | 0.921 | 0.400 | | |
| 12 | Infinity | 0.175 | 1.517 | 64.20 |
| 13 | Infinity | 0.301 | | |
| Image Plane | | | | |

| Lens | Start Surface | Focal Length |
|---|---|---|
| Constituent Lens Data | | |
| 1 | 2 | 2.208 |
| 2 | 4 | −8.721 |
| 3 | 6 | −129.665 |
| 4 | 8 | −10.759 |
| 5 | 10 | 146.606 |
| Composite Focal Length | | |
| f2345 | | −3.918 |
| f45 | | −9.638 |

Aspheric Surface Data

| | 2nd Surface | 3rd Surface | 4th Surface | 5th Surface | 6th Surface |
|---|---|---|---|---|---|
| k | 0.000E+00 | 0.000E+00 | 0.000E+00 | 6.491E+01 | 0.000E+00 |
| A4 | −5.668E−02 | −5.900E−02 | 9.466E−02 | 1.534E−01 | −9.712E−02 |

TABLE 10-continued

| A6  | 2.506E−01  | −2.017E+00 | −1.298E+00 | 9.612E−01  | −1.139E−01 |
|-----|------------|------------|------------|------------|------------|
| A8  | −1.677E+00 | 1.190E+01  | 1.114E+01  | −3.229E+00 | −9.826E+00 |
| A10 | 3.666E+00  | −4.127E+01 | −4.131E+01 | 1.254E+01  | 7.730E+01  |
| A12 | −3.994E+00 | 6.008E+01  | 6.393E+01  | −3.088E+01 | −2.544E+02 |
| A14 | −4.355E+00 | −2.517E+01 | −2.337E+01 | 3.811E+01  | 3.999E+02  |
| A16 | 0.000E+00  | 0.000E+00  | 0.000E+00  | 0.000E+00  | −2.538E+02 |

|     | 7th Surface | 8th Surface | 9th Surface | 10th Surface | 11th Surface |
|-----|-------------|-------------|-------------|--------------|--------------|
| k   | 0.000E+00   | 4.746E+00   | 4.971E+00   | −5.024E+00   | −4.953E+00   |
| A4  | 2.123E−01   | 1.433E+00   | 7.690E−01   | −6.513E−01   | −3.747E−01   |
| A6  | −2.230E+00  | −5.232E+00  | −2.033E+00  | 4.468E−01    | 2.907E−01    |
| A8  | 3.500E+00   | 1.070E+01   | 2.392E+00   | −1.870E−01   | −2.000E−01   |
| A10 | 5.491E+00   | −1.633E+01  | −1.755E+00  | 9.469E−02    | 1.102E−01    |
| A12 | −2.517E+01  | 1.682E+01   | 7.871E−01   | −4.499E−02   | −4.109E−02   |
| A14 | 3.184E+01   | −1.031E+01  | −1.814E−01  | 1.166E−02    | 8.269E−03    |
| A16 | −1.412E+01  | 2.798E+00   | 1.264E−02   | −1.163E−03   | −6.533E−04   |

As shown in Table 11, the imaging lens in Example 10 satisfies all the conditional expressions (1) to (8).

Figure 20:
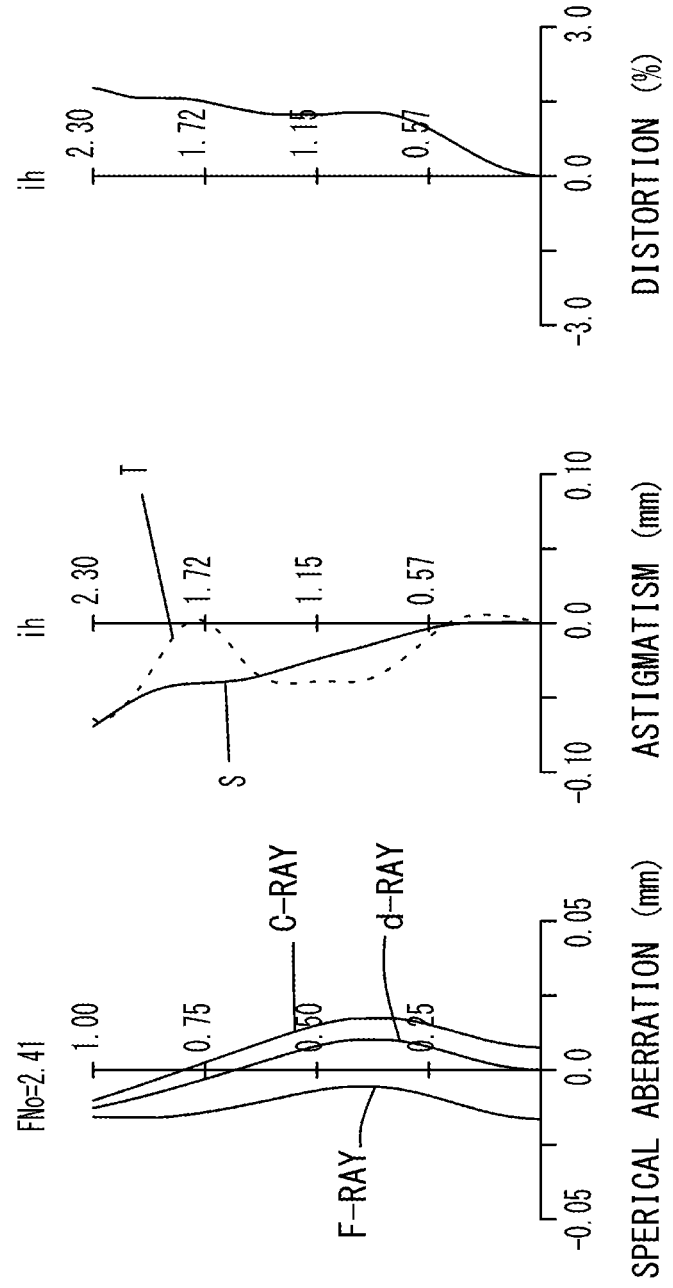
FIG. 20 shows spherical aberration, astigmatism, and distortion of the imaging lens in Example 10.

FIG. 20 shows spherical aberration (mm), astigmatism (mm), and distortion (%) of the imaging lens in Example 10. As shown in FIG. 20, each aberration is corrected properly.

In Example 10, total track length TTL is 3.09 mm, suggesting that the imaging lens is low-profile though it uses five constituent lenses. Also, the imaging lens offers a wide field of view of about 79 degrees and high brightness with an F-value of about 2.41.

TABLE 11

|                                         | Example 1 | Example 2 | Example 3 | Example 4 | Example 5 | Example 6 | Example 7 | Example 8 | Example 9 | Example 10 |
|-----------------------------------------|-----------|-----------|-----------|-----------|-----------|-----------|-----------|-----------|-----------|------------|
| Conditional Expression (1) TTL/2ih      | 0.71      | 0.71      | 0.69      | 0.71      | 0.71      | 0.71      | 0.69      | 0.72      | 0.71      | 0.67       |
| Conditional Expression (2) vd1 − vd2    | 32.32     | 32.32     | 32.32     | 32.32     | 32.32     | 32.32     | 32.32     | 31.60     | 32.32     | 32.32      |
| Conditional Expression (3) vd3 − vd4    | 32.41     | 32.41     | 32.41     | 32.41     | 32.41     | 32.41     | 32.41     | 0.00      | 0.00      | 32.41      |
| Conditional Expression (4) f1/f         | 0.60      | 0.64      | 0.63      | 0.64      | 0.61      | 0.65      | 0.67      | 0.74      | 0.63      | 0.80       |
| Conditional Expression (5) f2345/f      | −0.76     | −0.85     | −0.81     | −0.86     | −0.78     | −0.87     | −0.93     | −1.18     | −0.82     | −1.42      |
| Conditional Expression (6) r4/f         | 1.67      | 1.66      | 1.79      | 1.66      | 1.79      | 1.74      | 1.76      | 1.65      | 1.76      | 1.90       |
| Conditional Expression (7) (r1 + r2)/(r1 − r2) | −0.86 | −1.06 | −0.98 | −1.05 | −0.91 | −1.07 | −1.05 | −1.41 | −0.98 | −1.55 |
| Conditional Expression (8) f45/f        | −3.99     | −3.86     | −3.89     | −4.68     | −3.88     | −3.85     | −4.30     | −3.51     | −4.32     | −3.49      |

As explained above, the imaging lenses according to the examples of the present invention are low-profile enough to meet the growing demand for low-profileness, with total track length TTL of 3.3 mm or less and a total length to diagonal ratio of 0.8 or less, though they use five constituent lenses. In addition, these imaging lenses can offer a wide imaging field of view of 75 to 79 degrees and high brightness with an F-value of 2.5 or less, correct various aberrations properly and feature low cost.

When any one of the imaging lenses composed of five constituent lenses according to the examples of the present invention is used for an optical system built in an image pickup device mounted in an increasingly compact and low-profile mobile terminal such as a smartphone, mobile phone or PDA (Personal Digital Assistant), or a game console or an information terminal such as a PC, or a home appliance with a camera function, it delivers high camera performance and contributes to the low-profileness of the image pickup device.

The effects of the present invention are as follows.

According to the present invention, there is provided a compact imaging lens which meets the demand for low-profileness, offers high brightness with an F-value of 2.5 or less and a wide field of view and corrects various aberrations properly.

What is claimed is:

1. An imaging lens which forms an image of an object on a solid-state image sensor, in which elements are arranged in order from an object side to an image side, comprising:
   a first lens with positive refractive power having a convex surface on the object side;
   a second lens with negative refractive power having a concave surface on the image side;
   a third lens with negative refractive power;
   a fourth lens with negative refractive power as a meniscus double-sided aspheric lens having a convex surface on the image side; and
   a fifth lens as a double-sided aspheric lens having a concave surface on the image side, wherein
   the aspheric image-side surface of the fifth lens has a pole-change point off an optical axis, and conditional expressions (1) and (2) below are satisfied:

$$TTL/2ih \leq 0.8 \quad (1)$$

$$20 < vd1 - vd2 < 50 \quad (2)$$

where
vd1: Abbe number of the first lens at d-ray
vd2: Abbe number of the second lens at d-ray
ih: maximum image height
TTL: total track length.

2. The imaging lens according to claim 1,
wherein a conditional expression (3) below is satisfied:

$$0 < vd3 - vd4 < 40 \tag{3}$$

where
vd3: Abbe number of the third lens at d-ray
vd4: Abbe number of the fourth lens at d-ray.

3. The imaging lens according to claim 1,
wherein conditional expressions (4) and (5) below are satisfied:

$$0.4 < f1/f < 1.0 \tag{4}$$

$$-1.5 < f2345/f < -0.6 \tag{5}$$

where
f: focal length of an overall optical system of the imaging lens
f1: focal length of the first lens
f2345: composite focal length of the second lens, the third lens, the fourth lens, and the fifth lens.

4. The imaging lens according to claim 1,
wherein a conditional expression (6) below is satisfied:

$$1.5 < r4/f < 2.3 \tag{6}$$

where
f: focal length of an overall optical system of the imaging lens
r4: curvature radius of the image-side surface of the second lens.

5. The imaging lens according to claim 1,
wherein a conditional expression (7) below is satisfied:

$$-1.9 < (r1+r2)/(r1-r2) < -0.7 \tag{7}$$

where
r1: curvature radius of the object-side surface of the first lens
r2: curvature radius of the image-side surface of the first lens.

6. The imaging lens according to claim 1,
wherein a conditional expression (8) below is satisfied:

$$-6.0 < f45/f < -3.0 \tag{8}$$

where
f: focal length of an overall optical system of the imaging lens
f45: composite focal length of the fourth lens and the fifth lens.

* * * * *